US011446828B2

(12) United States Patent
Noh et al.

(10) Patent No.: US 11,446,828 B2
(45) Date of Patent: Sep. 20, 2022

(54) PARALLEL INTEGRATED DRIVE MECHANISM

(71) Applicant: EZWON INTERNET SERVICE CO., LTD., Gyeonggi-do (KR)

(72) Inventors: Jae Ho Noh, Seoul (KR); Woo Sung Yang, Seoul (KR); Jin Ho Yang, Gyeonggi-do (KR); Hyun Kuk Lim, Daegu (KR)

(73) Assignee: Ezwon Internet Service Co., Ltd., Gyeonggi-do (KR)

( * ) Notice: Subject to any disclaimer, the term of this patent is extended or adjusted under 35 U.S.C. 154(b) by 279 days.

(21) Appl. No.: 16/766,495

(22) PCT Filed: Jan. 8, 2019

(86) PCT No.: PCT/IB2019/050122
§ 371 (c)(1),
(2) Date: May 22, 2020

(87) PCT Pub. No.: WO2019/102446
PCT Pub. Date: May 31, 2019

(65) Prior Publication Data
US 2020/0376687 A1    Dec. 3, 2020

(30) Foreign Application Priority Data

Nov. 23, 2017  (KR) .......................... 10-2017-0157753

(51) Int. Cl.
*B25J 9/12*    (2006.01)
*H02K 9/22*    (2006.01)
(Continued)

(52) U.S. Cl.
CPC .......... *B25J 17/0283* (2013.01); *B25J 9/106* (2013.01); *B25J 9/126* (2013.01); *H02K 9/18* (2013.01); *H02K 9/22* (2013.01); *H02K 2201/18* (2013.01)

(58) Field of Classification Search
CPC .... B25J 17/0283; B25J 17/02; B25J 15/0246; B25J 9/106; B25J 9/126; B25J 9/12;
(Continued)

(56) References Cited

U.S. PATENT DOCUMENTS 4,577,127 A      3/1986  Ferree et al.
11,130,245 B2 *  9/2021  Noh .......................... B25J 9/126
(Continued)

FOREIGN PATENT DOCUMENTS

JP    H5138573 A    6/1993
JP    2005144627 A  6/2005
(Continued)

*Primary Examiner* — Michael Andrews
(74) *Attorney, Agent, or Firm* — Fox Rothschild LLP

(57) ABSTRACT

A parallel type integrated actuator is proposed. The actuator includes: a driving unit composed of a plurality of motors, each motor being stacked successively in a longitudinal direction of the driving unit, each motor having a stator fixed to a position outside the driving unit and a rotor positioned inside thereof, each motor rotating relative to each other; a plurality of shafts; a heat sink housing having a cylindrical shape formed around the outer surface of the driving unit, and having an inner circumferential surface thereof thermally connected with the plurality of stators and a plurality of flow paths formed on the outer circumferential surface thereof; and a blower fan installed on one end side of the driving unit, provided with a wing part disposed to be adjacent to one end side of the heat sink housing, wherein rotation generates convection for heat exchange.

13 Claims, 23 Drawing Sheets

(51) Int. Cl.
  *B25J 17/02* (2006.01)
  *B25J 9/10* (2006.01)
  *H02K 9/18* (2006.01)
(58) Field of Classification Search
  CPC ........... B25J 9/0024; H02K 9/18; H02K 9/22;
                                H02K 2201/18; H02K 16/025
  USPC ...................................................... 74/490.03
  See application file for complete search history.

(56) References Cited

U.S. PATENT DOCUMENTS

| | | | |
|---|---|---|---|
| 2012/0210817 A1* | 8/2012 | Kassow | ............... B25J 19/0004 |
| | | | 74/490.03 |
| 2014/0154038 A1* | 6/2014 | Hudgens | .................. B25J 9/042 |
| | | | 414/800 |
| 2014/0292163 A1* | 10/2014 | Lau | .......................... H02K 9/14 |
| | | | 310/60 R |

FOREIGN PATENT DOCUMENTS

| | | |
|---|---|---|
| KR | 101301374 B1 | 8/2013 |
| KR | 20140131231 A | 11/2014 |
| KR | 101693246 B1 | 1/2017 |

* cited by examiner

PARALLEL INTEGRATED DRIVE MECHANISM

CROSS-REFERENCES TO RELATED APPLICATIONS

This application is a 35 U.S.C. § 371 U.S. national entry of International Application No. PCT/IB2019/050122, having an international filing date of Jan. 8, 2019 which claims under 35 U.S.C. § 119 the benefit of Korean Application 10-2017-0157753 filed on Nov. 23, 2017. The entire contents of these applications are incorporated herein by reference in their entirety.

TECHNICAL FIELD

The present invention relates to a four-degree-of-freedom parallel type integrated actuator to be used in joints of a robot and the like to implement the four degrees of freedom and, more particularly, to a four-degree-of-freedom parallel type integrated actuator having effective heat dissipation of motors and compact size of heat a sink part.

BACKGROUND ART

Mechanically configured rotators applied to joints of robots and the like may be classified into serial and parallel types according to a design method and interpretation thereof, and performance of the rotators may be measured according to a characteristic of each type. The serial type is applicable in large workspace and relatively easy for the design and interpretation thereof, and thereby is widely used.

However, since a serial type structure lacks precision due to an accumulation of actuator joint errors and is unable to provide relatively large power at the distal end of the structure, a device with a parallel type structure has recently been studied in order to solve this problem. The parallel type structure has high rigidity, has low inertia due to a design that the actuator is able to be placed on the base part, has high precision, and enables the actuator to generate great power at the distal end thereof, thereby providing good performance as a rotator. However, the parallel type structure has many peculiar characteristics that are hard to control, so the workspace is small and the interpretation is difficult. Therefore, a redundant link structure is added, an overdrive is added, or a serial-parallel combination type is designed in order to solve the problem and to enhance the performance.

In such a parallel type structure that is problematic, one of the structures derivatively developed by focusing on rotational motion is a spherical parallel structure, in which a rotational axis of all joints in the spherical parallel structure coincides with a fixed point therein and makes a pure point-centered rotational motion. However, desktop devices based on the distal end of the spherical parallel structure are not intuitive for a specific joint movement because identifying the specific joint movement of a robot and providing a sense of a position and movement is impossible.

Whereas, an exoskeleton type structure is intuitively controllable by using motions of joints in the human body. However, an arrangement of joint axes of the rotator is an important design consideration for the rotator because a design constraint is high and an awkward movement may occur when the joint axes are not coincident.

The foregoing is intended merely to aid in the understanding of the background of the present invention, and is not intended to mean that the present invention falls within the purview of the related art that is already known to those skilled in the art.

An example of the related arts may be referred to Korean Patent No. 10-1693246 B1

DISCLOSURE

Technical Problem

The present invention is proposed to solve such a problem and is to provide a parallel type integrated actuator capable of reducing a volume of the entire structure thereof while maximally reducing interference of joints, having a low inertia of moving parts, and implementing the joint movement intuitively.

In addition, the present invention is to provide a parallel type integrated actuator that efficiently performs heat dissipation of a motor and has a compact size of a heat sink part.

Technical Solution

In order to achieve the objective of the present invention, there is provided a parallel type integrated actuator including: a driving unit composed of a plurality of motors which are stacked successively in a longitudinal direction of the driving unit, and each motor is provided with a stator fixed to a position on outside of the driving unit and a rotor respectively positioned on inside thereof, the rotors rotating relative to each other; a plurality of shafts is provided with one end part thereof respectively connected to each rotor at a position on inside of each rotor, wherein each shaft is inserted into each other through a hollow structure and forming a co-axis, wherein each shaft is capable of rotating relative to each other in an inserted state, and wherein each shaft is provided with other end part thereof extending toward the outside of the driving unit; a distal end part disposed at the position on the outside of the driving unit, and on which an actuator is mounted thereto; a heat sink housing having a cylindrical shape formed around an outer surface of the driving unit, having an inner circumferential surface thereof thermally connected with the plurality of stators, and provided with a plurality of flow paths formed on an outer circumferential surface thereof; and a blower fan installed on one end side of the driving unit, provided with a wing part disposed to be adjacent to one end side of the heat sink housing, wherein rotation generates convection for heat exchange between air flowing through the flow paths of the heat sink housing and air outside the driving unit.

A fan motor of the blower fan may be installed at a center of one end side of the driving unit, and the blower fan may be rotated by connecting a central part and the fan motor to each other and the wing part may be formed along a circumference of the central part.

Flow paths of the heat sink housing may be formed along a longitudinal direction of the heat sink housing, and the blower fan may be a centrifugal fan that may generate convection for the air in the flow paths of the heat sink housing and outside air in a circumferential direction thereof.

The heat sink housing may be provided with a plurality of external heat exchange fins extending in the longitudinal direction of the heat sink housing on the outer circumferential surface of the heat sink housing and disposed in a circumferential direction thereof, and flow paths formed between the external heat exchange fins.

The heat sink housing may be provided with a cylindrical part having a cylindrical shape surrounding the outer surface of the driving unit, a plurality of internal heat exchange fins may be formed on an inner circumferential surface of the cylindrical part, and the internal heat exchange fins may be thermally connected to the plurality of stators.

An enclosed space may be formed between the inner circumferential surface of the heat sink housing with the cylindrical shape and the plurality of stators, and a heat-transfer fluid may be filled in the enclosed space.

A separation space may be formed between the stators of the driving unit, and each separation space may be connected to the enclosed space so that the heat transfer fluid may be also filled in the enclosed space.

The heat sink housing may be provided with the plurality of external heat exchange fins forming flow paths on the outer circumferential surface thereof, so that the wing part of the blower fan may be disposed to be adjacent to one end side of the external heat exchange fins of the heat sink housing.

A motor driver of the driving unit may be installed on the outer circumferential surface of the heat sink housing.

Two driving units may be coupled to each other so that one end parts of the driving units may be facing each other, each shaft of the driving units may extend in an opposite direction at other end part of each driving unit, one blower fan may be installed between one end part of each driving units, and each driving unit may share one blower fan.

Each of the driving units may be provided with the heat sink housing, and the wing parts of the blower fan may be respectively adjacent to the flow paths of both heat sink housings at each of the opposite sides thereof.

The wing part of the blower fan may be provided with a plurality of wing plates formed along a circumference of the blower fan, and may be in a flange shape extending outward along the circumference of the blower fan, so that a separation plate may be formed to divide the wing plates into two parts, and the heat dissipation of the driving units may be separated by the separation plate.

The driving unit may be provided with a first motor, a second motor, a third motor, and a fourth motor; the shaft may be provided with a first shaft, a second shaft, and a third shaft, which are respectively connected to the first rotor, the second rotor, and the third rotor, which are respectively each rotor of the first motor, the second motor, and the third motor; and the parallel type integrated actuator may further include a first link part, a second link part, and a third link part respectively connecting the first shaft, the second shaft, and the third shaft to the distal end part and transmitting rotational force of the first shaft, the second shaft, and the third shaft to the distal end part so as to allow the distal end part to rotate in pitching, yawing, and rolling directions; and a universal link part connecting the fourth rotor, which may be the rotor of the fourth motor, and the distal end part to each other.

Advantageous Effects

According to the parallel type integrated actuator of the present invention, in realizing joints with four degrees of freedom, reproducing a free motion is possible while avoiding a collision between the instruments.

In particular, heat dissipation of the motor is effectively performed, and the size of the heat sink part is compact.

In addition, by realizing basic three degrees of freedom of pitching, yawing, and rolling, and simultaneously adding another rolling thereto, another motion of a manipulator may be realized simultaneously at the end of the joints.

While realizing four degrees of freedom, a volume and weight of the joint actuator as a whole may be maximally reduced.

MODE FOR INVENTION

Figure 1:
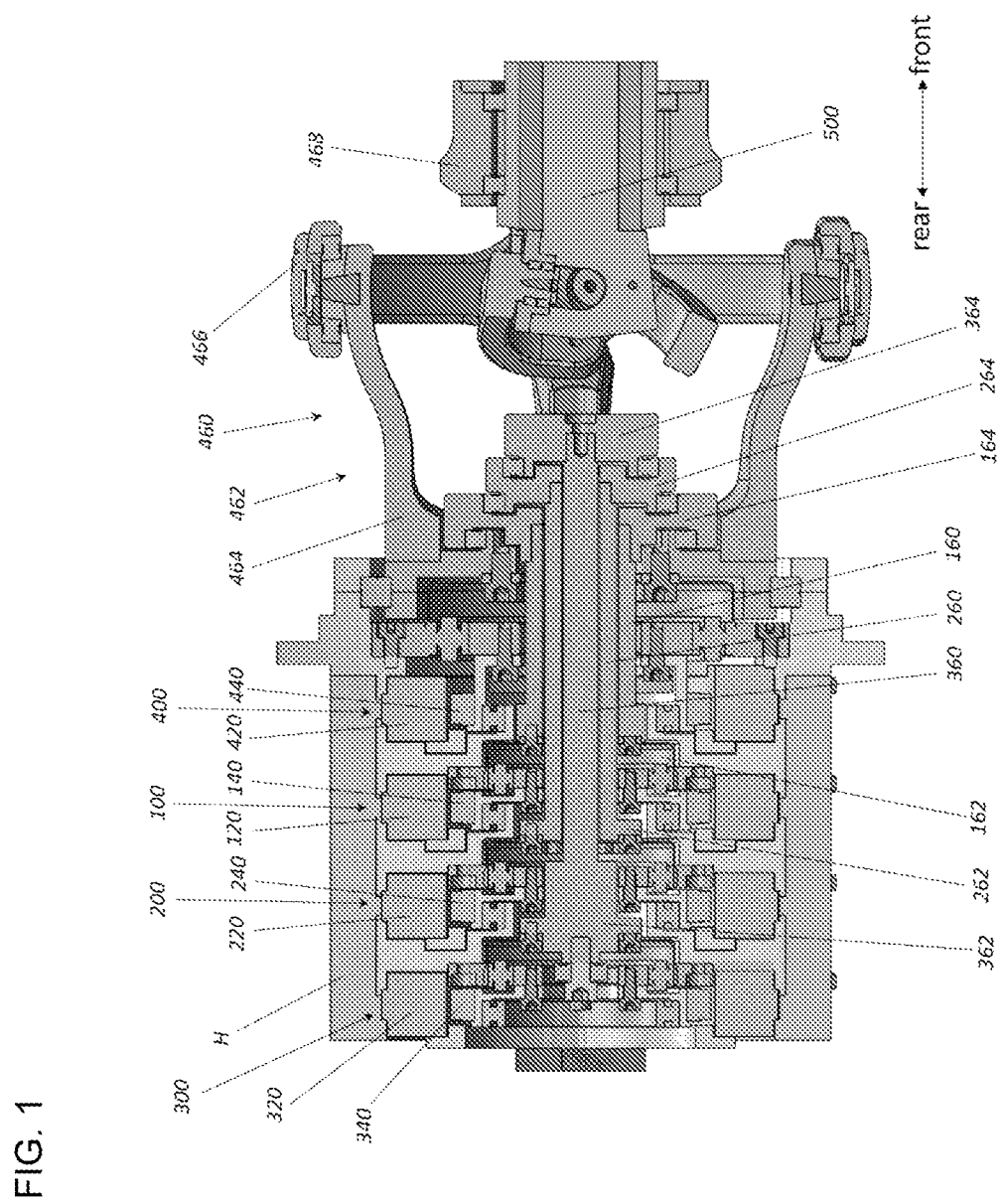
FIG. 1 is a cross-sectional view showing a parallel type integrated actuator according to an exemplary embodiment of the present invention.
Figure 2:
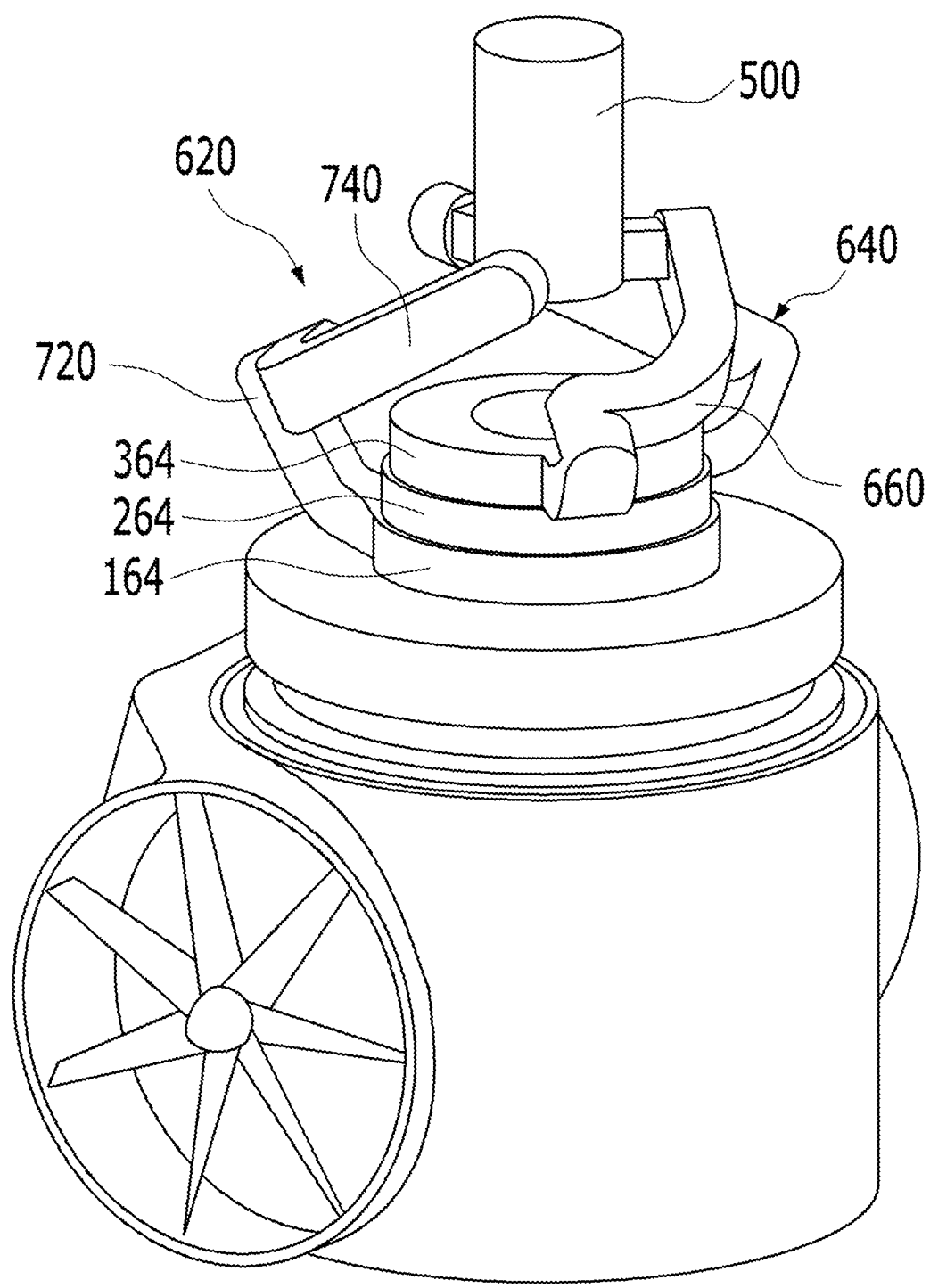
FIGS. 2 and 3 are perspective views showing the parallel type integrated actuator shown in FIG. 1.
Figure 3:
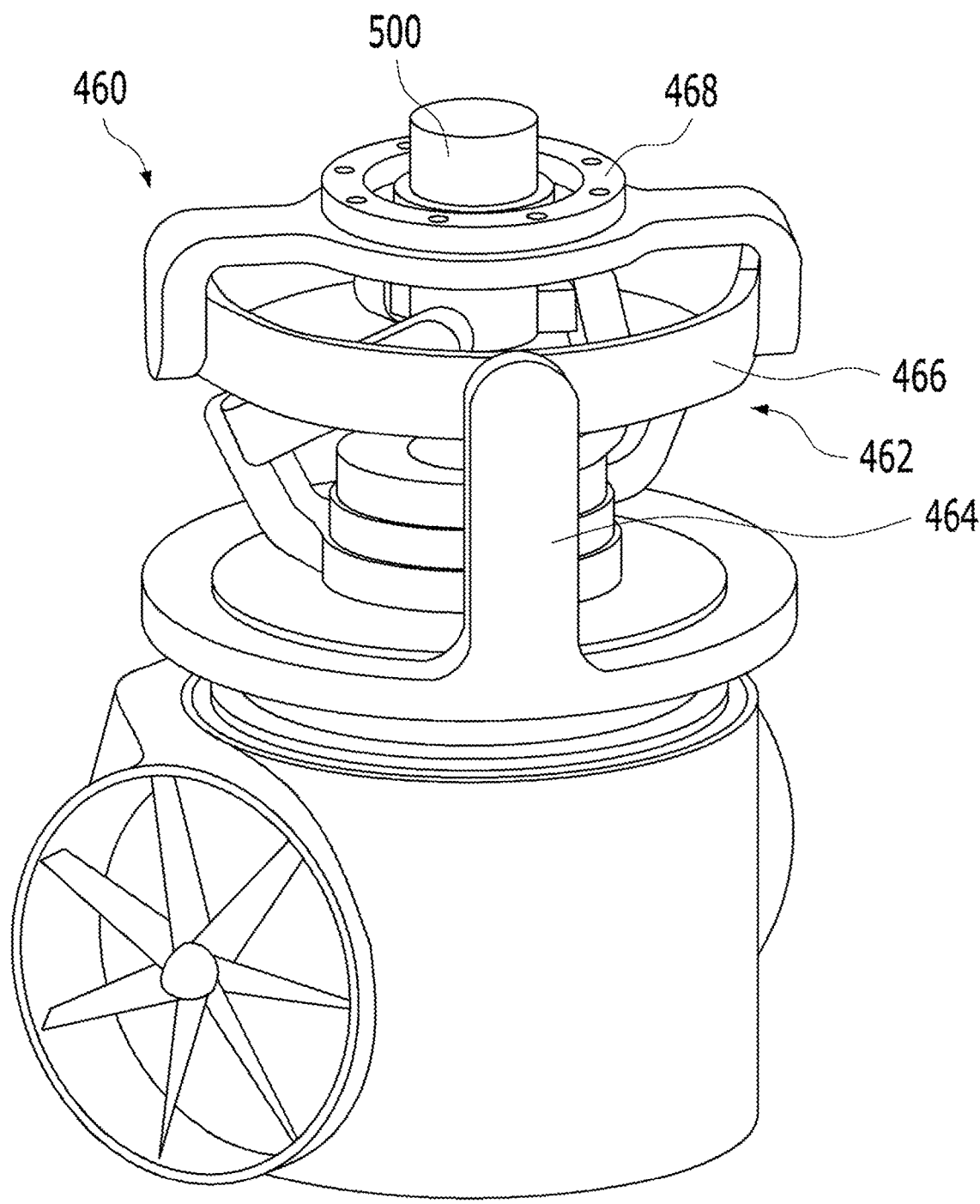
Figure 16:
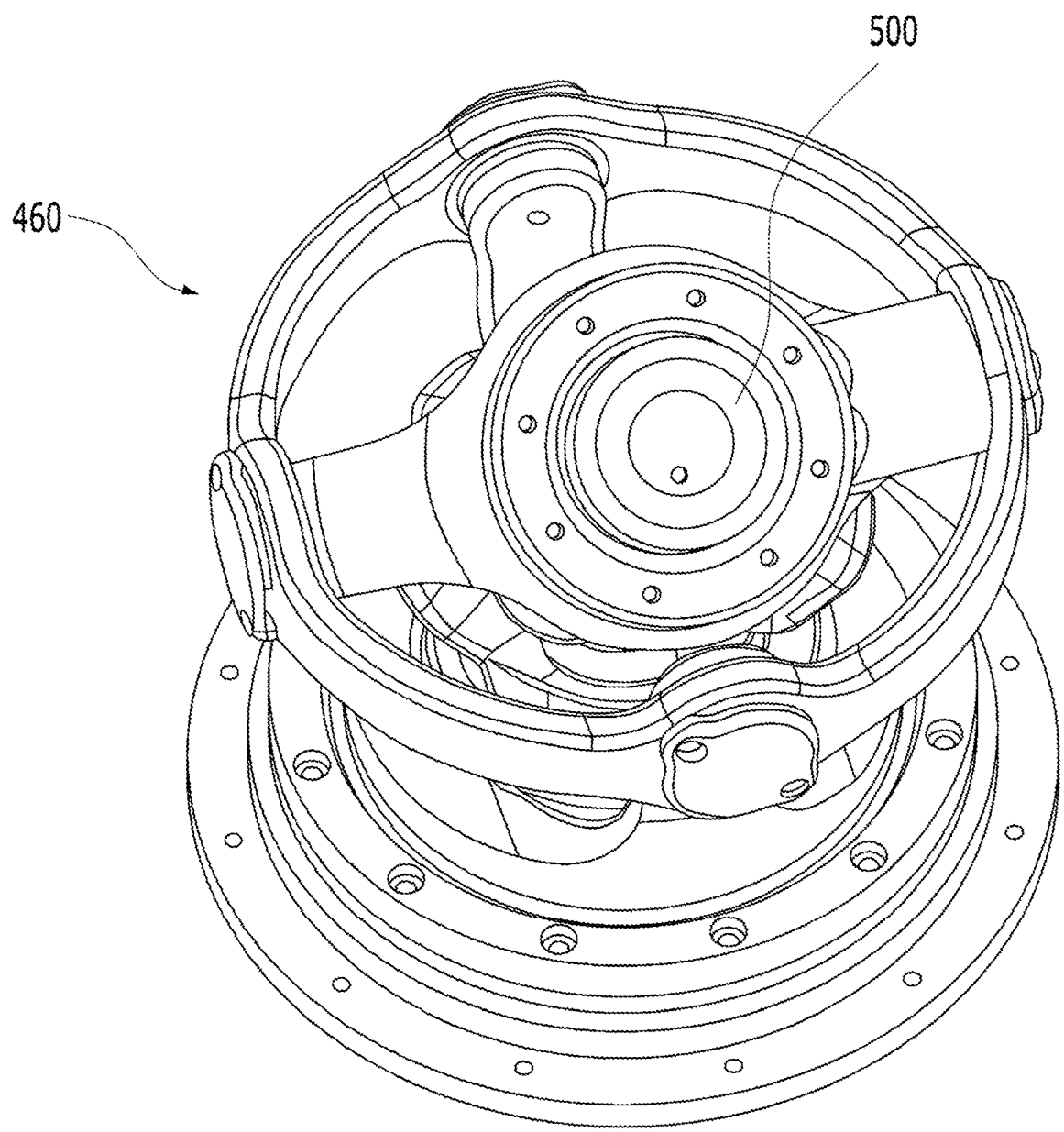
Figure 17:
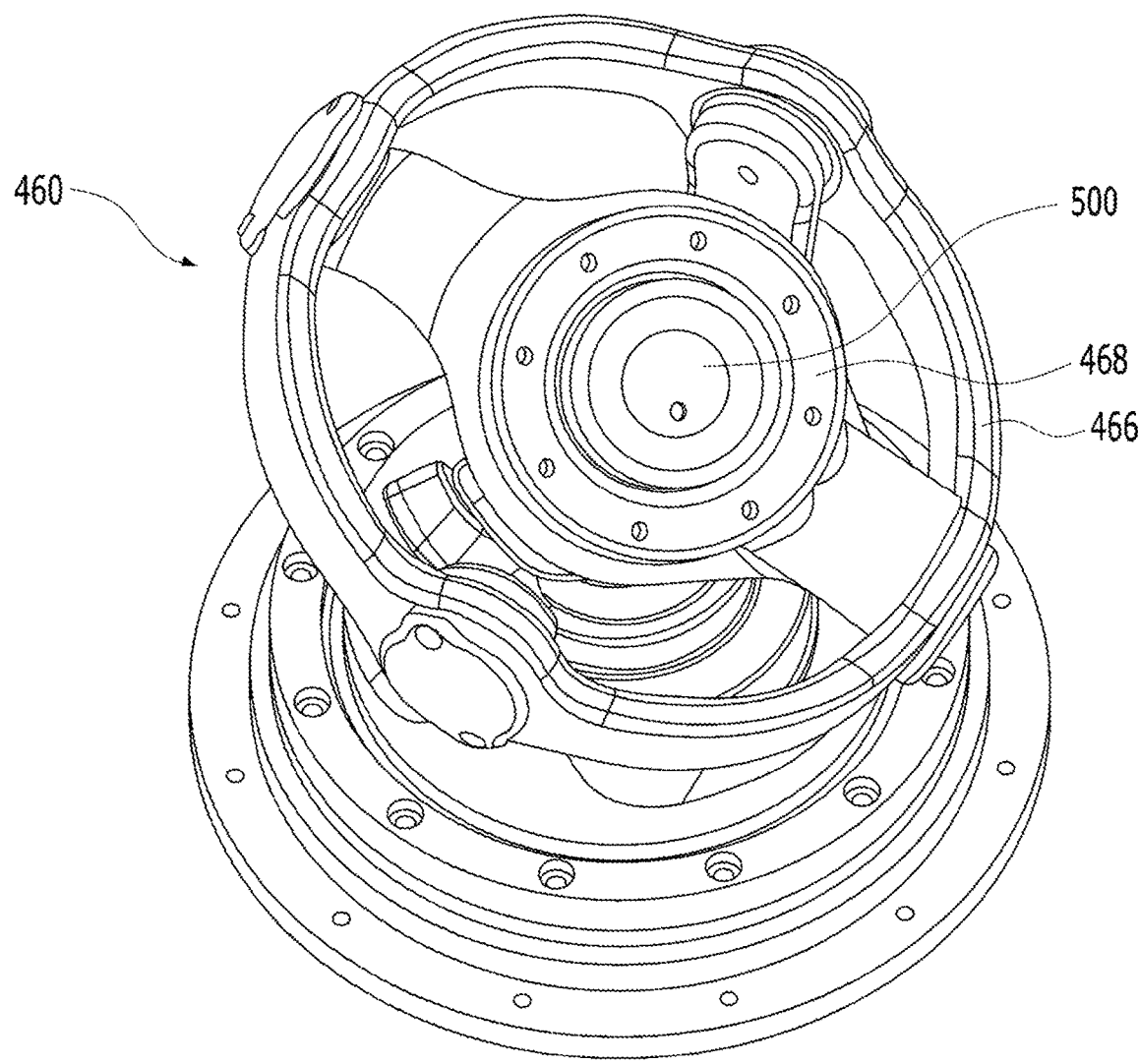
Figure 18:
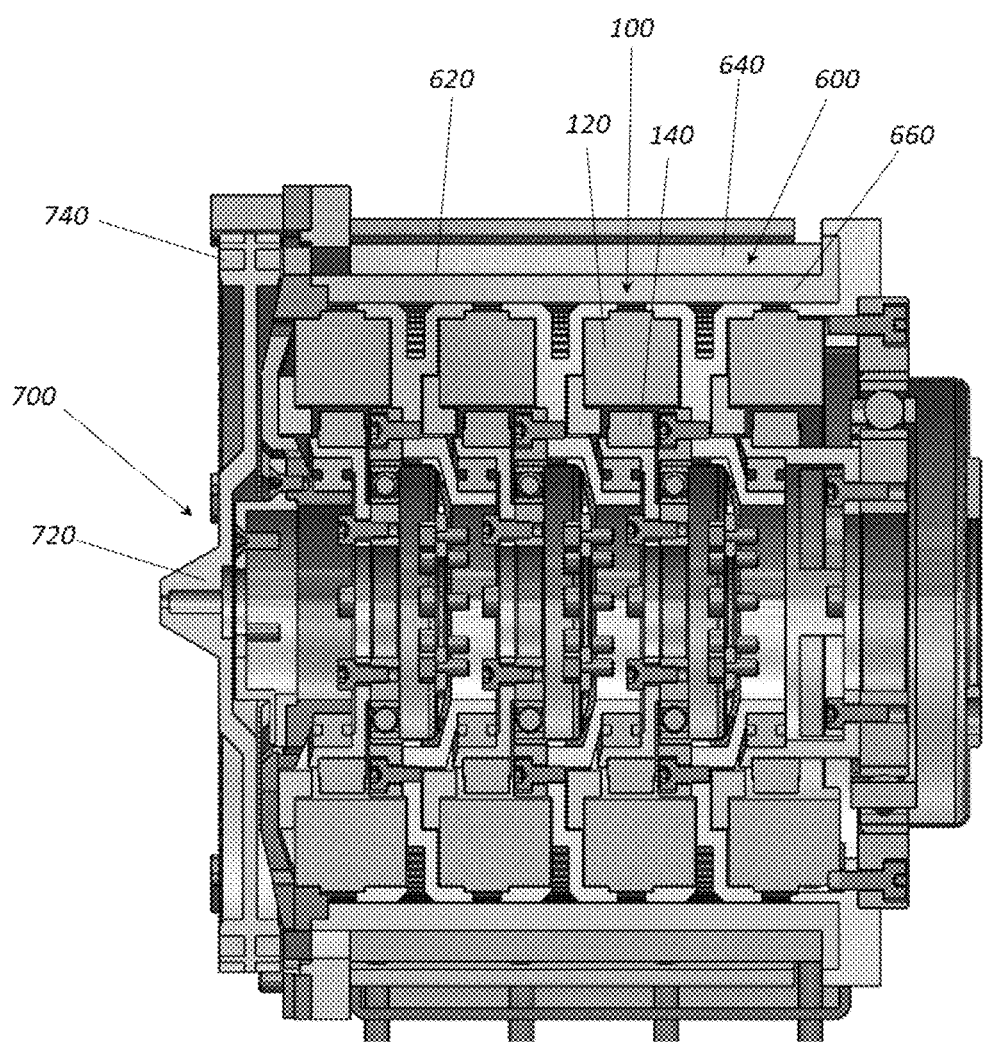
FIGS. 18 and 19 are cross-sectional views showing the parallel type integrated actuator according to another exemplary embodiment of the present invention.
Figure 19:
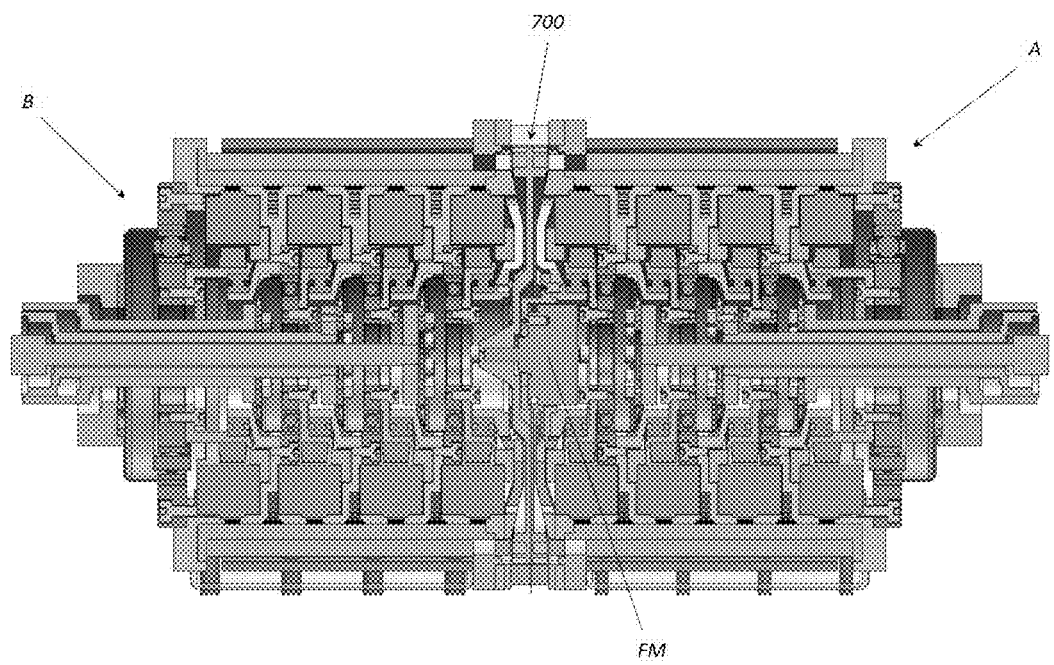
Figure 20:
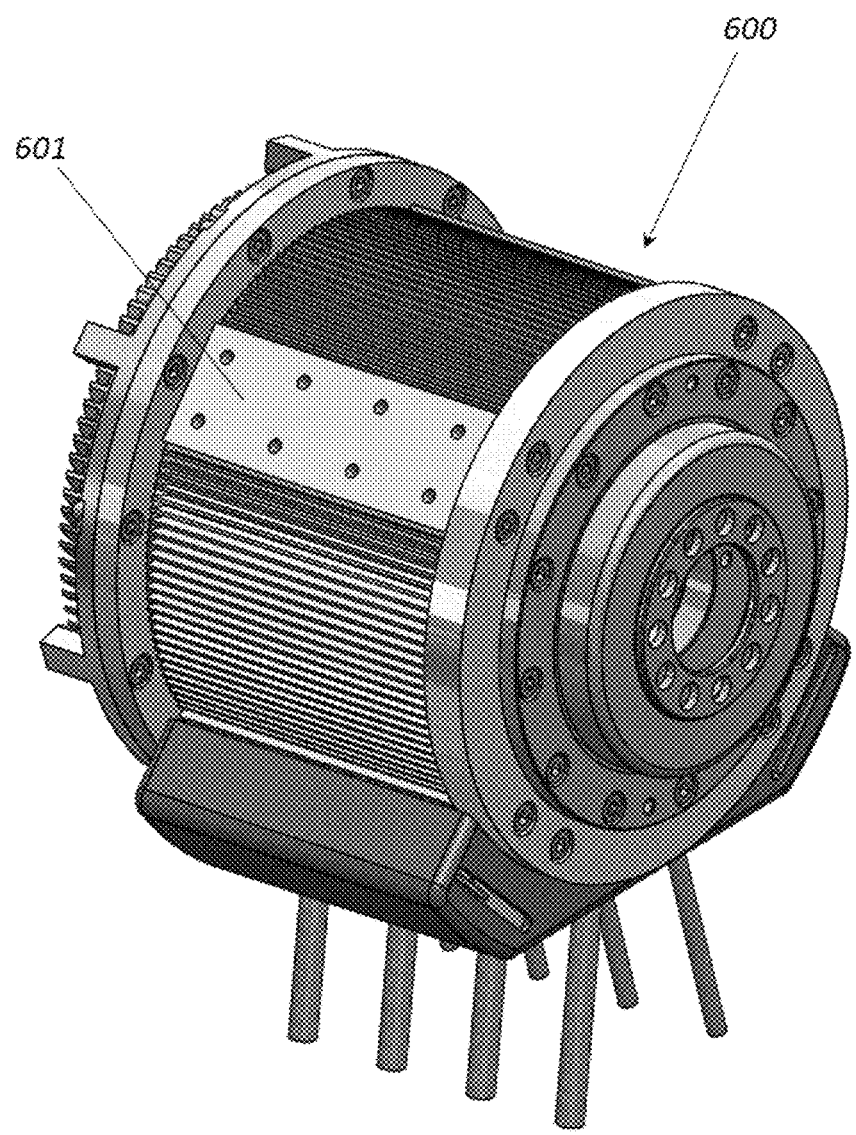
FIGS. 20 to 22 are views showing a heat sink housing of the parallel type integrated actuator of the present invention.
Figure 21:
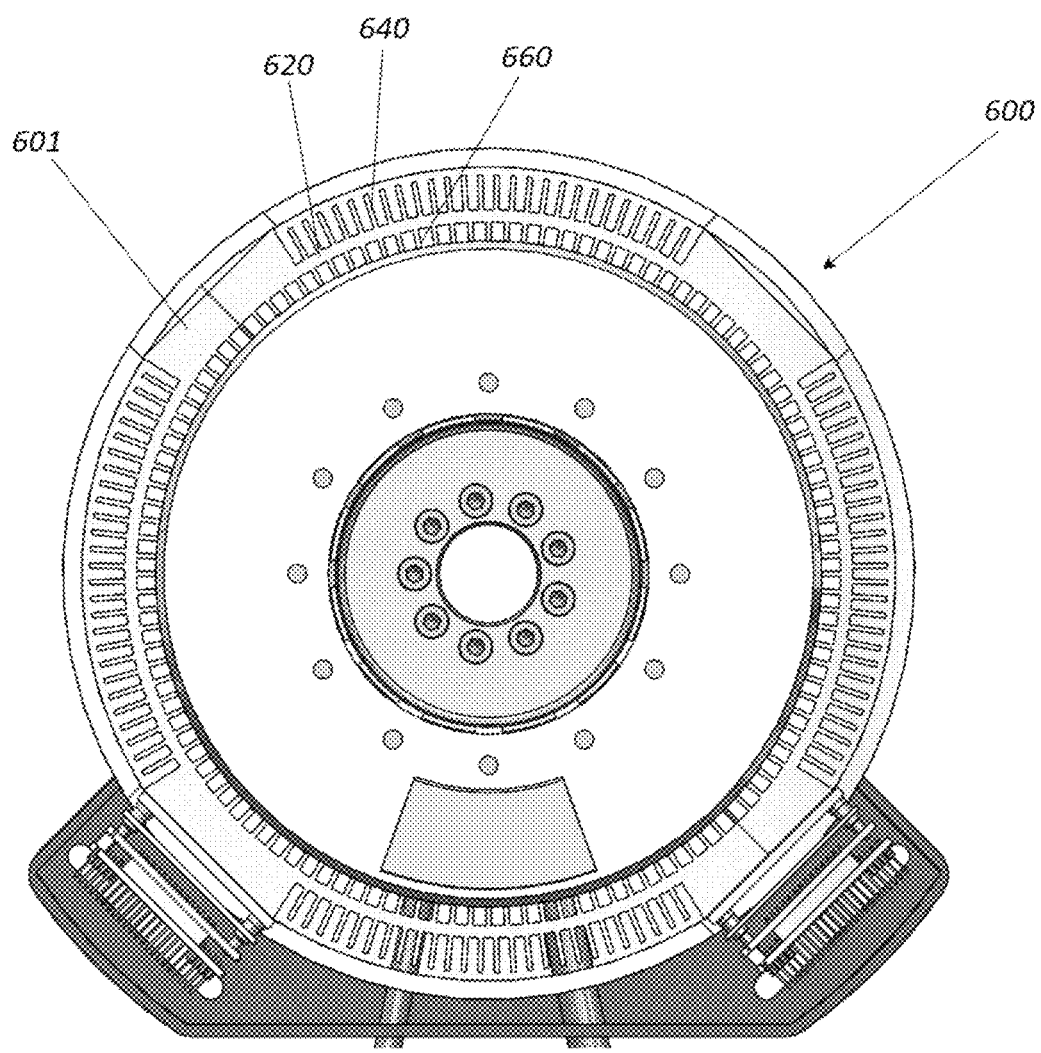
Figure 22:
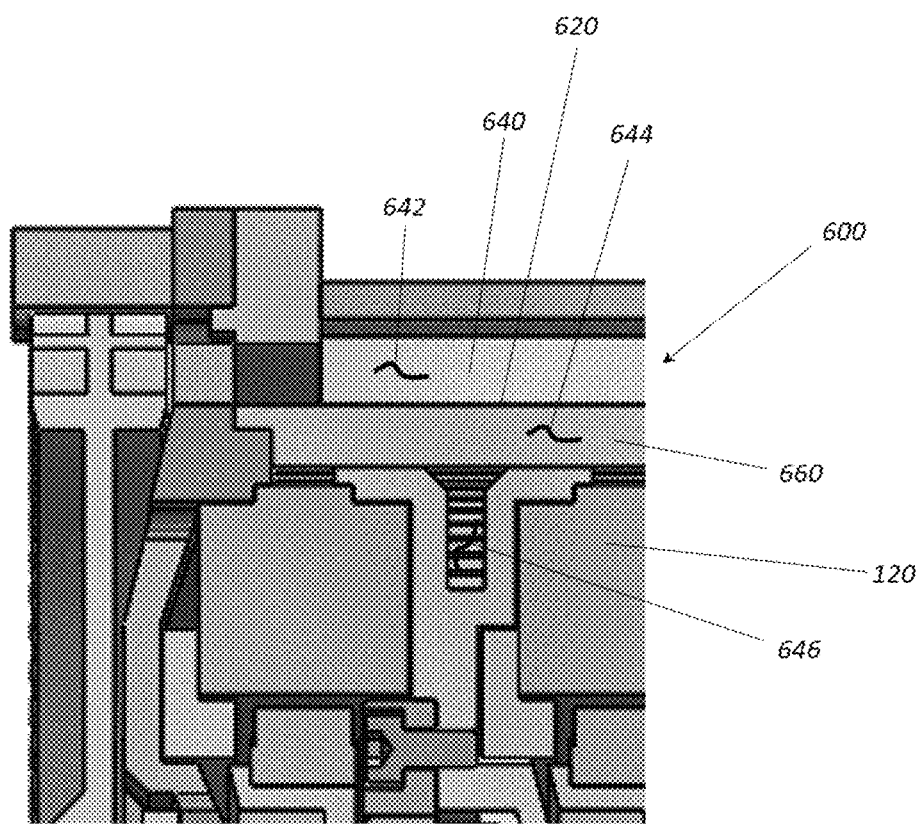
Figure 23:
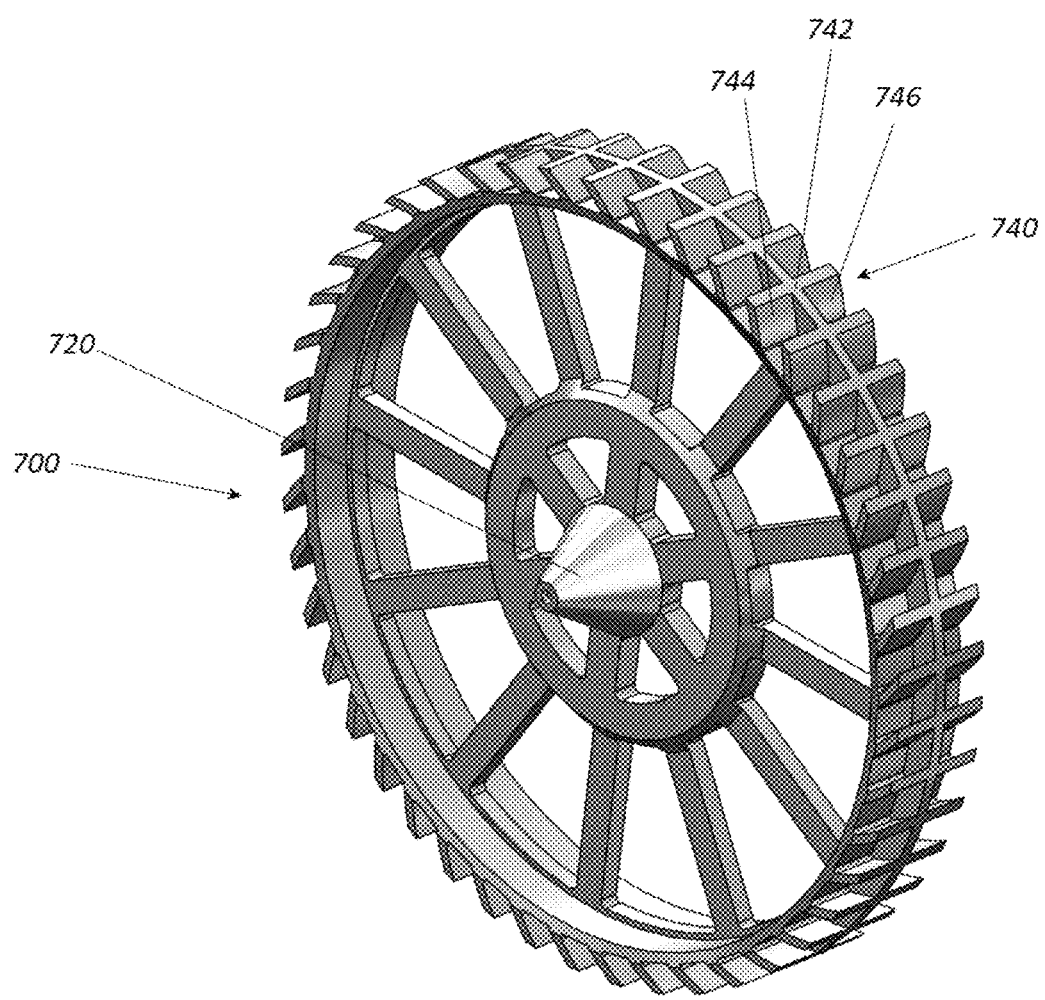
FIG. 23 is a view showing a blower fan of the parallel type integrated actuator of the present invention.

FIG. 1 is a cross-sectional view showing a parallel type integrated actuator according to an exemplary embodiment of the present invention, FIGS. 2 and 3 are perspective views showing the parallel type integrated actuator shown in FIG. 1, FIGS. 4 to 10 are views showing operation process of the parallel type integrated actuator shown in FIG. 1, FIGS. 11 to 17 are another view showing the parallel type integrated actuator shown in FIG. 1, FIGS. 18 and 19 are cross-sectional views showing the parallel type integrated actuator according to another exemplary embodiment of the present invention, FIGS. 20 to 22 are views showing a heat sink housing of the parallel type integrated actuator of the present invention, and FIG. 23 is a view showing a blower fan of the parallel type integrated actuator of the present invention.

First, FIGS. 18 and 19 are cross-sectional views showing the parallel type integrated actuator according to another exemplary embodiment of the present invention, FIGS. 20 to 22 are views showing the heat sink housing of the parallel type integrated actuator of the present invention, and FIG. 23 is a view showing the blower fan of the parallel type integrated actuator of the present invention.

Referring to the diagrams, the parallel type integrated actuator according to the present invention includes: a driving unit composed of a plurality of motors, which are stacked successively in a longitudinal direction of the driving unit, and each of the motors is provided with a stator 120 fixed to a position on the outside of the driving unit and a rotor 140 respectively located on the inside thereof, the motors rotating relative to each other; a plurality of shafts, wherein each shaft is provided with one end part thereof respectively connected to each of the rotors 140 at a position on the inside of each rotor 140, wherein each shaft is inserted into each other through a hollow structure and forming a co-axis, wherein each shaft is capable of rotating relative to each other in the inserted state, and wherein each shaft is provided with the other end part thereof extending toward the outside of the driving unit; a distal end part disposed at a position on the outside of the driving unit, and on which an actuator is mounted; a heat sink housing 600 having a cylindrical shape formed around an outer surface of the driving unit, and having an inner circumferential surface thereof thermally connected to a plurality of stators 120, wherein a plurality of flow paths is formed on an outer circumferential surface thereof; and a blower fan 700 installed on one end side of the driving unit, and provided with a wing part 740 disposed to be adjacent to one end side of the heat sink housing 600, wherein rotation generates convection for heat exchange between the air flowing through the flow paths of the heat sink housing 600 and the air outside the driving unit.

The parallel type integrated actuator of the present invention is composed of a plurality of motors, wherein three motors are responsible for controlling the pitching, yawing, and rolling directions of the parallel type integrated actuator, and the remaining motor is to implement a separate independent rolling. Through this, the parallel type integrated actuator has four degrees of freedom, so that effective simulation of joints of the human body is possible.

In addition, the parallel type integrated actuator of the present invention has an advantage of being compact in size by stacking four motors and being further compact in size by overlapping a plurality of links in the driving modules as well.

Particularly, as shown above, the driving unit of the present invention is composed of the plurality of motors, each of which is stacked successively in the longitudinal direction of the driving unit, provided with a stator 120 fixed to a position outside of the driving unit and a rotor 140 positioned inside thereof, and rotating relative to each other. In addition, there is provided the plurality of shafts, each of which is provided with one end part thereof respectively connected to each of rotors 140 at a position inside each rotor 140, is inserted into each other through a hollow structure, is formed a co-axis, is capable of rotating relative to each other in the inserted state, and is provided with the other end part thereof extending toward outside of the driving unit. In addition, the distal end part is disposed at a position outside of the driving unit, and on which an actuator is mounted.

The parallel type integrated actuator of the present invention is designed to heat dissipate the motors and motor drivers 601 of the driving unit, and for this purpose, is provided with the heat sink housing 600. The heat sink housing 600 has the cylindrical shape formed around the outer surface of the driving unit, has the inner circumferential surface thereof thermally connected with the plurality of stators 120, and is provided with the plurality of flow paths formed on the outer circumferential surface thereof.

In addition, the blower fan 700 is installed on one end side of the driving unit and is provided with the wing part 740 disposed to be adjacent to one end side of the heat sink housing 600, wherein rotation generates convection for heat exchange between the air flowing through the flow paths of the heat sink housing 600 and the air outside the driving unit.

In other words, a plurality of motors and motor drivers 601 may be cooled at the same time through one heat sink housing 600 having the cylindrical shape surrounding the outside of the driving unit. In addition, since the heat sink housing 600 is able to be heat dissipated by using only one blower fan 700 at one side of the heat sink housing, there is an advantage in that the size for whole cooling is compact and the configuration is simple. In addition, since the plurality of motors are indirectly and thermally connected to each other through the heat sink housing 600, the thermal mass is very large. Thus, there is an advantage in that the heat may be absorbed sufficiently and dissipated by the remaining motors even in an environment in which some of the motors are driven intensively.

Particularly, a fan motor FM of the blower fan 700 may be installed at the center of one end side of the driving unit, the blower fan 700 may be rotated by connecting a central part 720 and the fan motor FM to each other, and the wing part 740 may be formed along the circumference of the central part 720. Through such a structure, the size of the blower fan 700 is maximally reduced and the fan motor FM for driving is installed at a position inside the driving unit to reduce the overall length.

In addition, the flow paths of the heat sink housing 600 are formed along the longitudinal direction of the heat sink housing 600, and the blower fan 700 may be a centrifugal fan that makes convection occur between the air in the flow paths of the heat sink housing 600 and external air in the circumferential direction thereof. Accordingly, the heat of the plurality of motors is convectively heat-transferred together through the flow paths, whereby the plurality of motors may be cooled together, and the entire motor may act as the thermal mass.

Meanwhile, on the outer circumferential surface, the heat sink housing 600 may be provided with a plurality of external heat exchange fins 640 extending in the longitudinal direction and disposed in the circumferential direction thereof, and may be provided with the flow paths 642 formed between the external heat exchange fins 640. Through this, the entire circumference of the heat sink housing 600 are matched with the wing part 740 of the blower fan to increase the heat exchange area, and resistance is reduced through the flow paths 642 having a linear shape, thereby enabling rapid cooling.

In addition, the heat sink housing 600 is provided with a cylindrical part 620 having a cylindrical shape surrounding the outer surface of the driving unit and a plurality of internal heat exchange fins 660 is formed on the inner circumferential surface of the cylindrical part 620, wherein the internal heat exchange fins 660 may be thermally connected to the plurality of stators 120. Here, an enclosed space 644 may be formed between the inner circumferential surface of the cylindrical part of the heat sink housing 600 and the plurality of stators 120, and a heat-transfer fluid may be filled in the enclosed space 644. This increases the heat exchange area between the heat sink housing 600 and the plurality of motors to enable effective heat exchange.

In addition, a separation space 646 is formed between the stators 120 of the driving unit, and each separation space 646 is connected to the enclosed space 644 so that the heat-transfer fluid may also be filled in the enclosed space. Through this, heat exchange between the motors may be performed at a higher efficiency to solve thermal imbalance between the motors. When overheating of some motors occurs, the remaining motors absorb the heat, so as to play a role of cooling together with the heat sink housing 600. By uniformly maintaining the durability of the motor and lowering the output variation depending on the temperature between the motors, reducing control errors and ensuring the ease and accuracy may be possible in terms of overall mechanical control.

Meanwhile, the heat sink housing 600 is provided with a plurality of external heat exchange fins that forms the flow paths on the outer circumferential surface, and the wing part 740 of the blower fan 700 may be disposed being adjacent to one end side of the external heat exchange fins of the heat sink housing 600. In other words, since the internal heat exchange fins of the heat sink housing 600 exchange heat with the motors in an enclosed space, the wing part 740 of the blower fan 700 is only to exchange heat with the external heat exchange fins 640 of the heat sink housing 600 for external heat exchange. In addition, as mentioned above, the motor drivers 601 of the driving unit may be installed on the outer circumferential surface of the heat sink housing 600. Through this, not only the motors but also the motor drivers 601 may be cooled together, and the temperature deviation between the motor drivers 601 may be reduced.

In particular, as shown in FIG. 19, two driving units are coupled to each other so as to face to each other at one end parts thereof. Each shaft of each of the driving units extend in the opposite direction to each other at the other end part of each driving unit. One blower fan 700 may be installed at a position between each one end part of each driving unit, and each driving unit may share one blower fan 700. In this case, each of the driving units may be provided with a heat sink housing 600, and the wing part 740 of the blower fan 700 may be respectively adjacent to the flow paths of both heat sink housings 600 at each of the opposite sides thereof.

In addition, the wing part 740 of the blower fan 700 is provided with a plurality of wing plates 740 formed along the circumference of the blower fan 700, and is in a flange shape extending outward along the circumference of the blower fan 700. As a result, a separation plate 742 is formed to divide the wing plates 740 into two parts 744 and 746, so that the heat dissipation of the driving units may be separated by the separation plate 742. Accordingly, the two driving units are simultaneously cooled by only one blower fan 700, and the convection flow is separated through the separator plate, thereby separating the cooling for each driving unit, securing a flow rate, and increasing efficiency of the blower fan 700.

In addition, the present invention may be applicable for industrial purposes as follows.

The driving unit of the present invention is provided with a first motor, a second motor, a third motor, and a fourth motor. The shafts are composed of a first shaft, a second shaft, and a third shaft, which are respectively connected to the first rotor, the second rotor, and the third rotor, which are respectively rotors of the first motor, the second motor, and the third motor. By respectively connecting the first shaft, the second shaft, and the third shaft to the distal end part, the rotational force of the first shaft, the second shaft, and the third shaft is transmitted to the distal end part. Therefore, the driving unit of the present invention may further include: a first link part, a second link part, and a third link part allowing the distal end part to rotate in the pitching, yawing, and rolling directions; and a universal link part connecting the fourth rotor, which is a rotor of the fourth motor, to the distal end part.

In particular, FIG. 1 is the cross-sectional view showing the parallel type integrated actuator according to the exemplary embodiment of the present invention, in which the parallel type integrated actuator according to the present invention includes: a driving unit composed of a first motor 100, a second motor 200, a third motor 300, and a fourth motor 400 which are stacked successively in the longitudinal direction of the driving unit, and each of the motors is provided with a stator fixed to a position outside of the driving unit and a rotor positioned inside thereof, the motors rotating relative to each other; a first shaft 160, a second shaft 260, and a third shaft 360, each of which has one end part thereof respectively connected to the first rotor 140, the second rotor 240, and the third rotor 340, each of which is a rotor of the first motor 100, the second motor 200, the third motor 300 at a position on the inside of each rotor, each shaft being inserted into each other through a hollow structure and forming a co-axis, each shaft capable of rotating relative to each other in the inserted state, and each shaft having the other end part thereof extending to the outside of the driving unit; a distal end part 500 disposed at a position outside the driving unit and on which an actuator is mounted; a first link part 620, a second link part 640, and a third link part 660, each of which respectively connects the first shaft 160, the second shaft 260, and the third shaft 360 to the distal end part 500 and transmits the rotational force of the first shaft 160, the second shaft 260, and the third shaft 360 to the distal end part 500 so as to allow the distal end part 500 to rotate in the pitching, yawing, and rolling directions; and a universal link part 460 connecting the fourth rotor 440, which is a rotor of the fourth motor 400, and the distal end part 500 to each other.

The parallel type integrated actuator of the present invention is composed of a plurality of motors, wherein three motors are responsible for controlling the pitching, yawing, and rolling directions of the parallel type integrated actuator, and the remaining motor is to implement a separate independent rolling. Through this, the parallel type integrated actuator has four degrees of freedom, so that effective simulation of joints of the human body is possible.

In addition, the parallel type integrated actuator of the present invention has an advantage of being compact in size by stacking four motors and being further compact in size by overlapping a plurality of links in the driving modules as well.

Particularly, the first motor 100, the second motor 200, the third motor 300, and the fourth motor 400 may be stacked so that the axis of rotation of each rotor is coincident. In addition, the first motor 100, the second motor 200, the third motor 300, and the fourth motor 400 may be implemented in a compact size by making the size of each of the stators and the rotors the same. In addition, a single housing H having a cylindrical shape may be shared.

The first motor 100, the second motor 200, the third motor 300, and the fourth motor 400, each of which is provided with the stator fixed to the housing H at a position outside of the each motor, and provided with the rotor respectively placed at a position inside thereof, the motors rotating relative to each other, are stacked successively in the longitudinal direction.

To each rotor, a shaft is respectively connected and rotates with the rotor. Particularly, in the case of the first shaft 160, the second shaft 260, and the third shaft 360, one end parts 162, 262, and 362 are respectively connected to the first rotor 140, the second rotor 240, and the third rotor 340 at the inside of each rotor, are inserted into each other through a hollow structure and form a co-axis, and are capable of rotating relative to each other in the inserted state. In addition, the other end parts of the shaft 164, 264, and 364 extend toward the outside of the driving unit. In other words, by connecting the three shafts in the form of a hollow structure, the diameter of the entire shaft unit becomes very small and the overall size becomes compact.

In addition, the distal end part 500 being rotated through the actual driving force is disposed at a position the outside of the driving unit, and the necessary mechanisms are mounted to the distal end part 500 in various ways. The first link part 620, the second link part 640, and the third link part 660 respectively connect the first shaft 160, the second shaft 260, the third shaft 360 to the distal end part 500 and transmit the rotational force of the first shaft 160, the second shaft 260, the third shaft 360 to the distal end part 500 so as to allow the distal end part 500 to rotate in the pitching, yawing, and rolling directions. Finally, the universal link part 460 connecting the fourth rotor 440 of the fourth motor 400 and the distal end part 500 to each other is provided to additionally implement separate independent rolling at the distal end part 500 side. Therefore, when the parallel type integrated actuator of the present invention is applied to a joint such as a robot, the basic pitching, yawing, and rolling of the joint are implemented, and at the same time, other joints may also be driven by using an additional independent rolling motion. For example, when the parallel type integrated actuator of the present invention is applied to a shoulder joint for a robot and the like, an intrinsic motion of the shoulder having two degrees of freedom is realized, and by using additional rolling, a bent motion of the upper and lower muscles of the arm may be performed together. In this case, a separate actuator on the elbow is not necessary, and there is an advantage of reducing the size and weight of the overall driving unit.

Meanwhile, the first link part 620, the second link part 640, and the third link part 660 may respectively be composed of a plurality of links. Particularly, the rear-end part of each link may be connected to the front-end part of each corresponding shaft, and the front-end part of each link may be spaced apart along a circumference of the rear-end part of the distal end part 500 and connected thereto. Here, a front-end part of each link is spaced apart from each other along the circumference of the distal end part 500 at the same height, and may be connected to the distal end part 500. Accordingly, the length of the distal end part 500 may be reduced, and the volume of the distal end part 500 may be reduced as much as possible. Preferably, the front-end part of each link may be spaced apart from each other at intervals of 120 degrees at the same height of the distal end part 500 and connected thereto.

Explaining the link in detail, each link is composed of a first link section 720 and a second link section 740, wherein the rear-end part of the first link section 720 may be rotatably coupled to the shaft, the rear-end part of the second link section 740 may be rotatably connected to the front-end part of the first link section 720, and the front-end part of the second link section 740 may be rotatably connected to the distal end part 500. In particular, as shown in FIG. 2, the first link section 720 is bent and extended in an oblique direction to the outside in a state where the rear-end part thereof is connected to a shaft, and the second link section 740 may be connected to the distal end part 500 by being bent inwardly toward the distal end part 500 once more after being extended to the side once in the state where the rear-end part of the second link section 740 is connected to the front-end part of the first link section 720. This structure of the link prevents mutual interference from occurring during the various motions of the rolling, pitching, and yawing.

Meanwhile, in the mutual coupling method of the shafts, the second shaft 260 may be inserted into inside the first shaft 160, and the third shaft 360 may be inserted into inside the second shaft 260. In other words, the three shafts are inserted into each other in the form of a hollow structure to make one large shaft as a whole. Accordingly, the third motor 300 may be positioned at the rearmost side, the second motor 200 may be disposed in front of the third motor 300, and the first motor 100 may be successively disposed in front of the second motor 200.

In such a combination of shafts and motors, the length of the third shaft 360 may be the longest, and the shaft length may be shortened one after another in the order of the second shaft 260 and the first shaft 160. In addition, the rear-end part of the third shaft 360 may be disposed at the rearmost end, the rear-end part of the second shaft 260 may be placed in the front of the third shaft, the rear-end part of the first shaft 160 may be placed in the front of the second shaft, and the rear-end part of each shaft may be connected to the rotor of the corresponding motor. In addition, the front-end part of the third shaft 360 may extend to be closest to the distal end part 500, and the front-end part of the second shaft 260, followed by the front-end part of the first shaft 160, may be placed at each position in a direction away from the distal end part 500. Through this structure, each shaft is inserted into the hollow, and at the same time, the size of each motor may be made the same, and even when being connected to the distal end part 500, the shafts are connected to each other at different heights at different angles, whereby there is an advantage in that interference between links is maximally reduced and a marginal angle that may be expressed by the distal end part 500 is eventually increased when performing motions such as rolling, pitching, and yawing.

Figure 4:
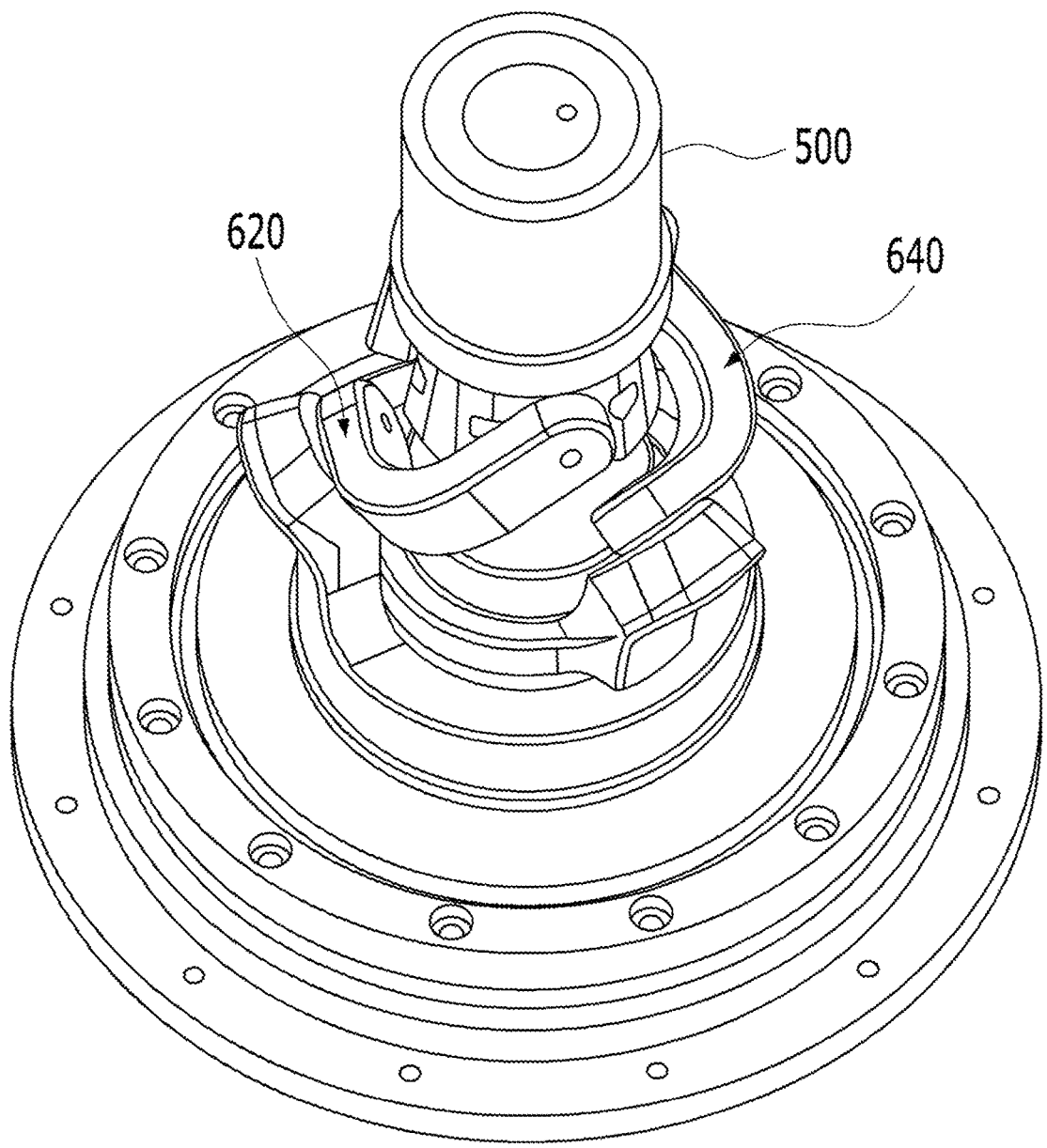
FIGS. 4 to 10 are views showing operation process of the parallel type integrated actuator shown in FIG. 1.
Figure 5:
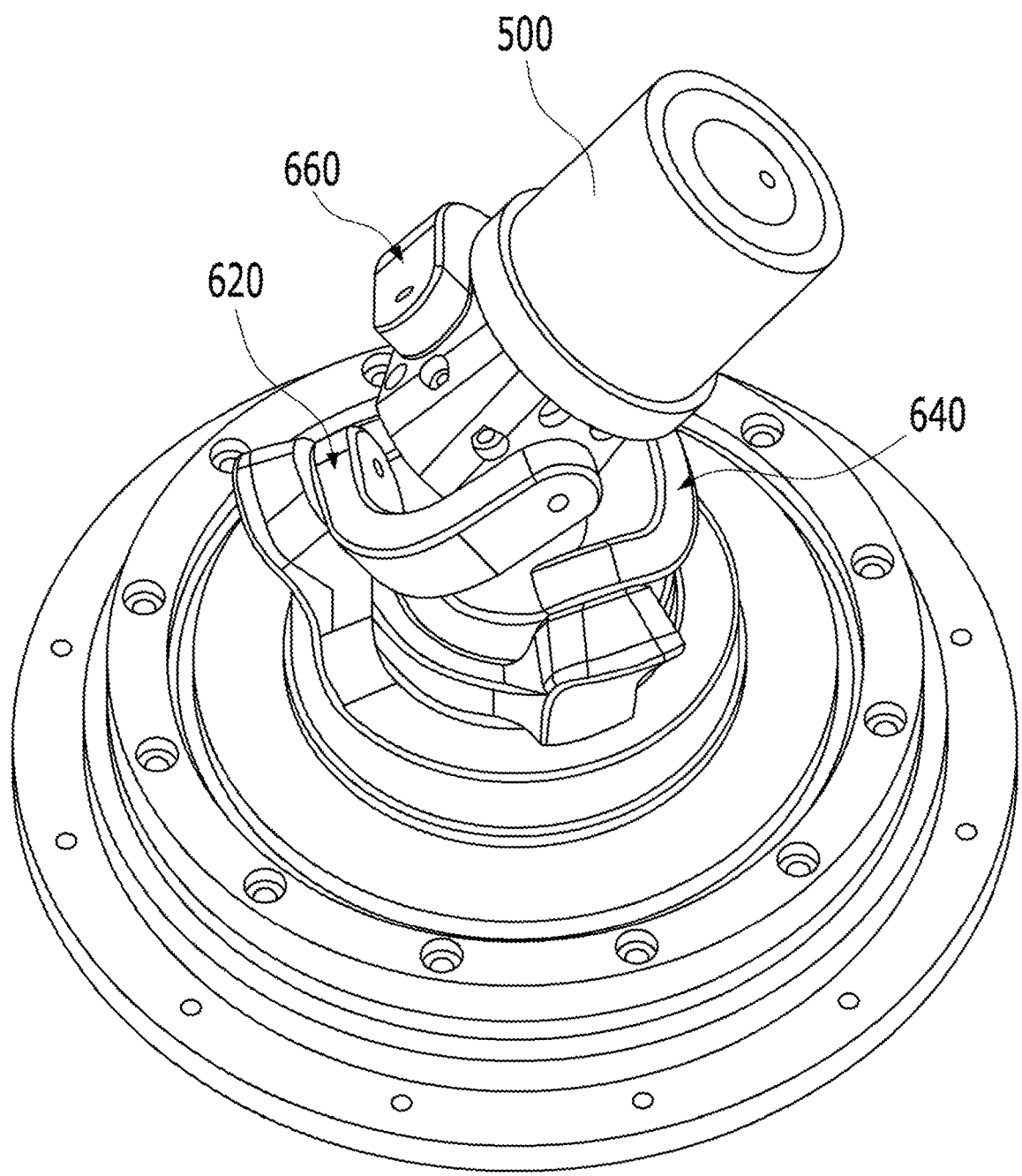
Figure 6:
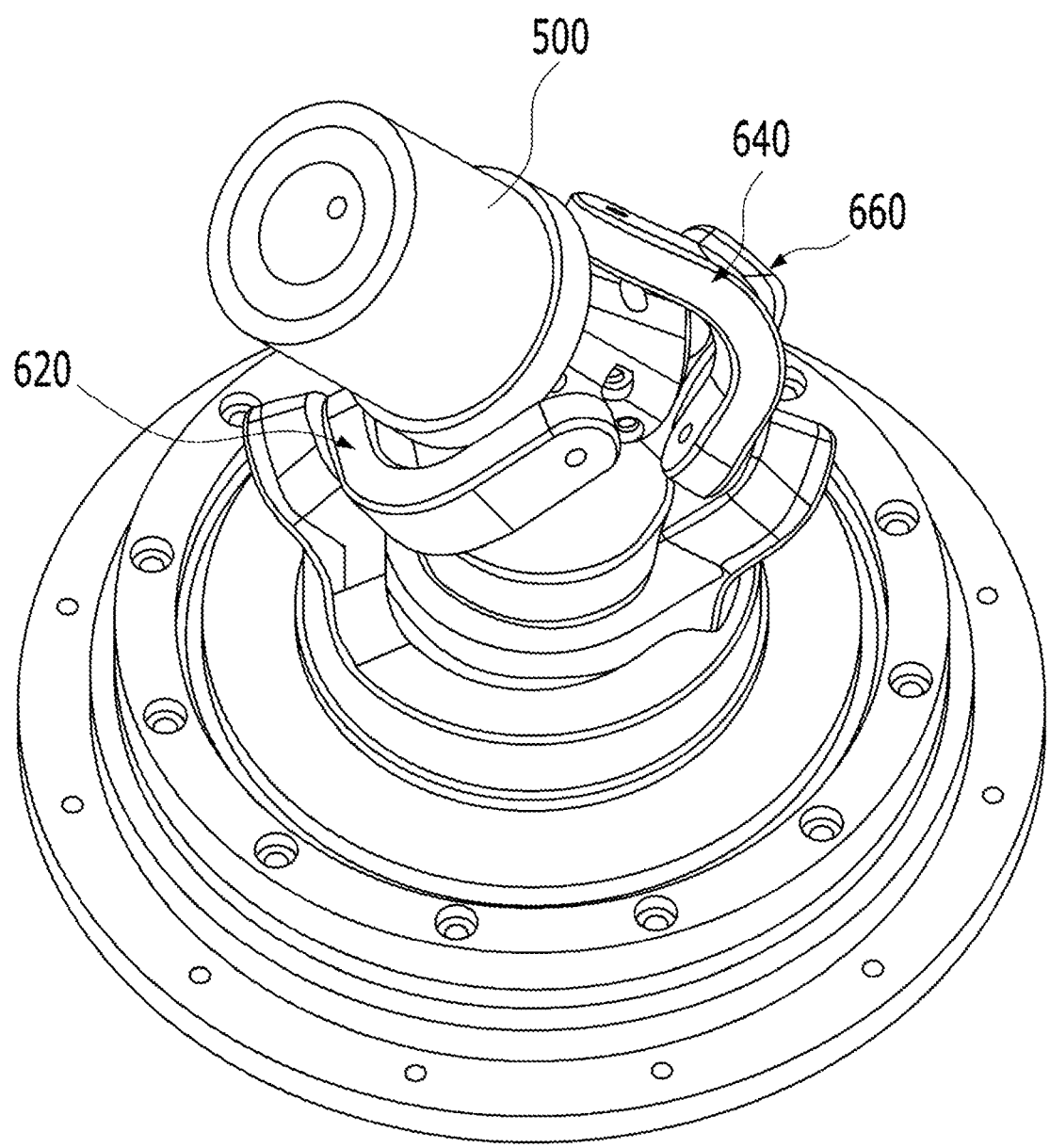
Figure 7:
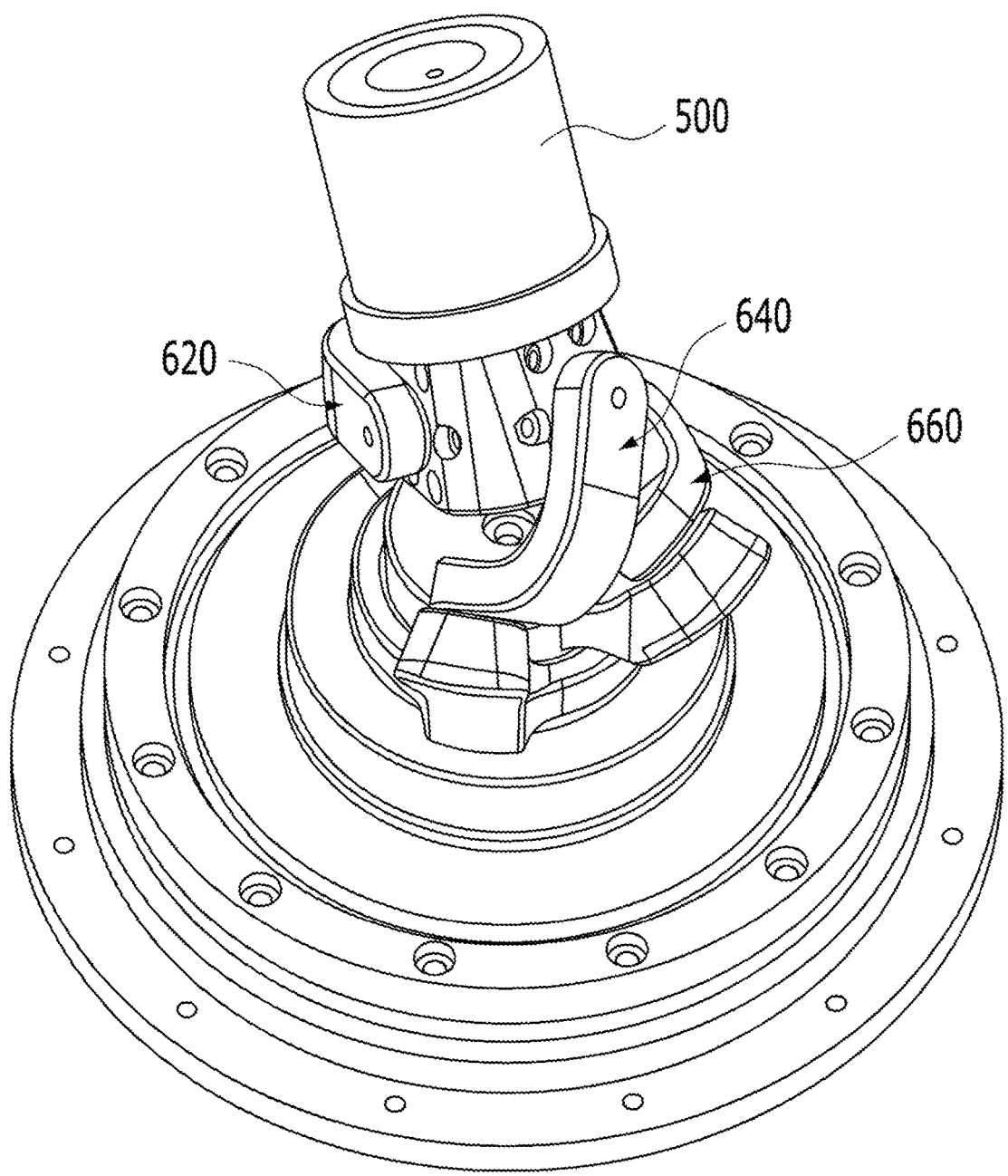
Figure 8:
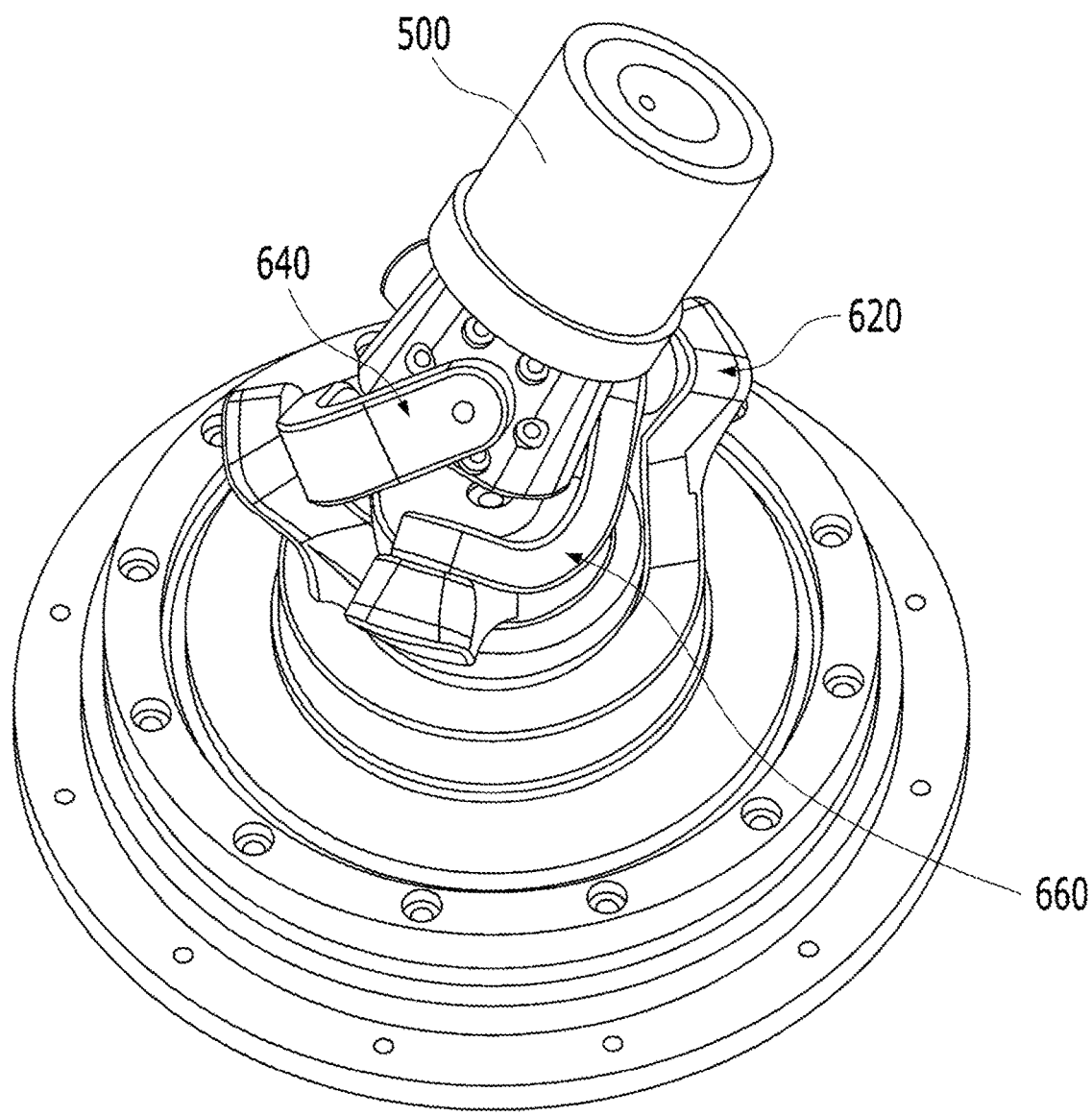
Figure 9:
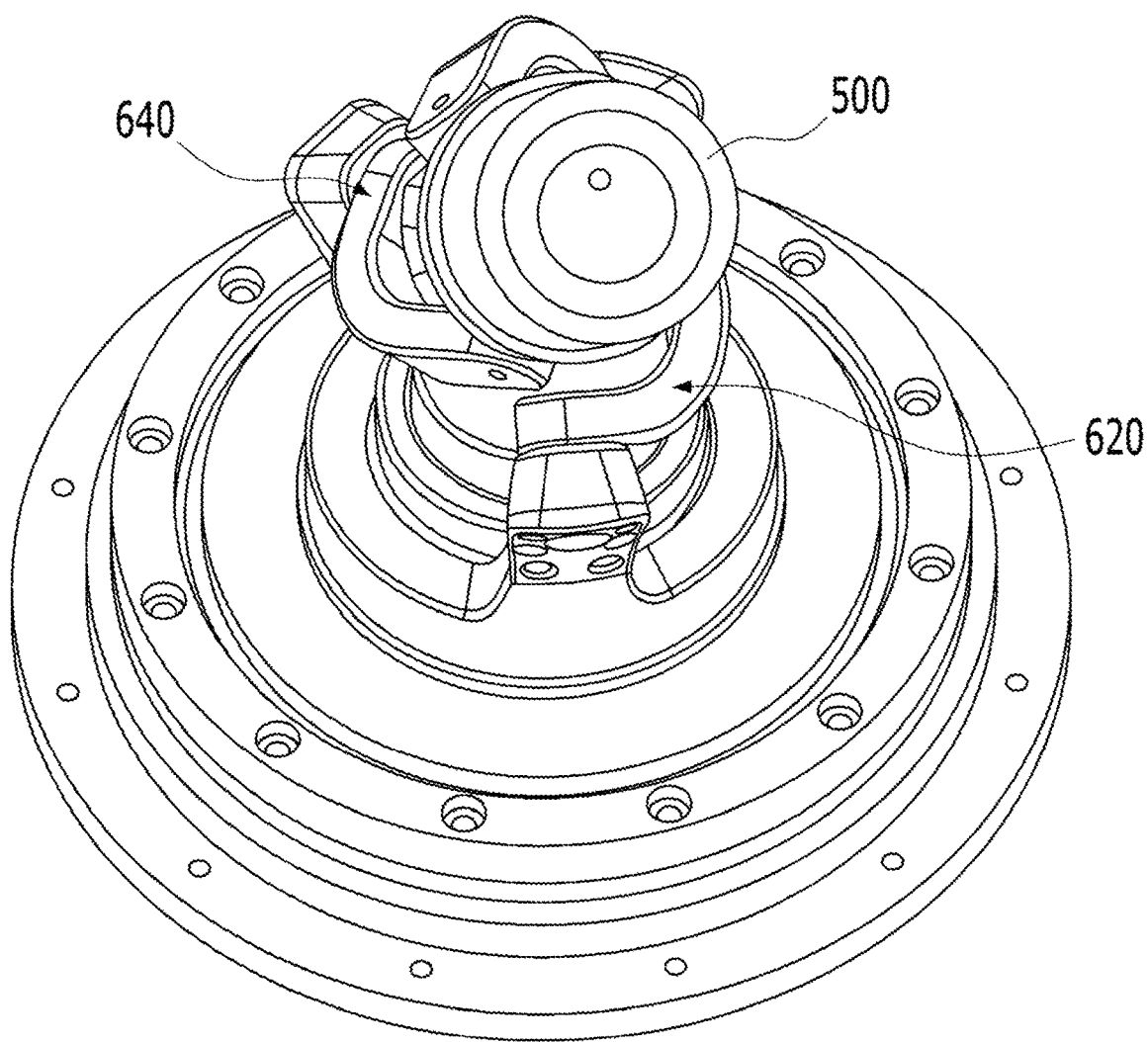
Figure 10:
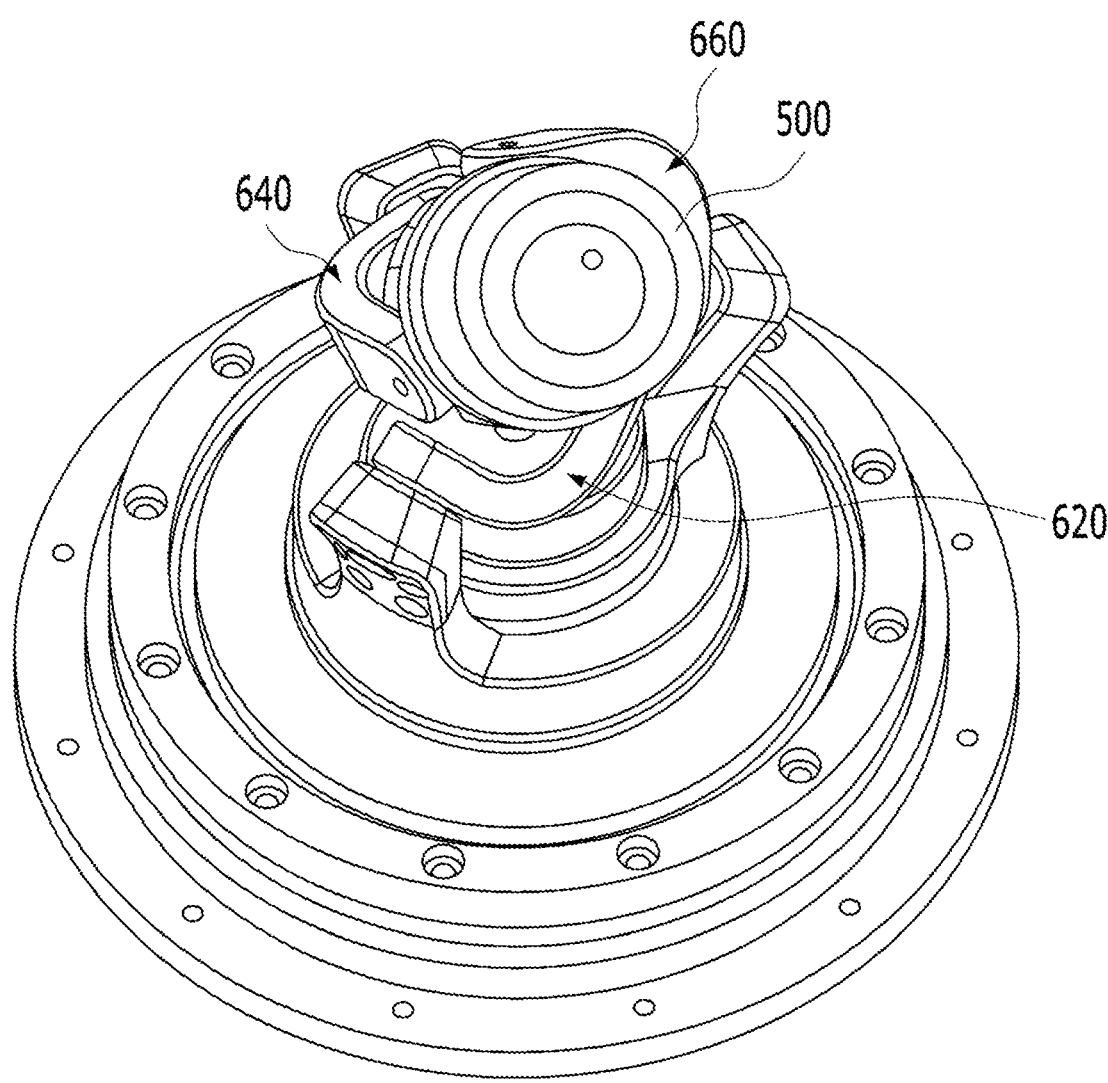

In performing motions, any one of the first rotor 140, the second rotor 240, and the third rotor 340 may be fixed, and the remaining rotors may be rotated so that the distal end part 500 may perform the pitching motion. FIGS. 4 to 6 illustrate the pitching motion of the distal end part 500. In this case, the first rotor 140 is fixed without moving, and thus the first link does not move neither. In that state, when the second link and the third link are separated from each other by the rotation of the second rotor 240 and the third rotor 340, the distal end part 500 is pitched to the right side as shown in FIGS. 4 and 5. Whereas, when the second link and the third link are closer to each other, the distal end part 500 is pitched to the left side as shown in FIGS. 5 and 6. Accordingly, any one of the first rotor 140, the second rotor 240, and the third rotor 340 may be fixed, and the remaining rotors are rotated so that the distal end part 500 may perform the pitching motion.

Figure 12:
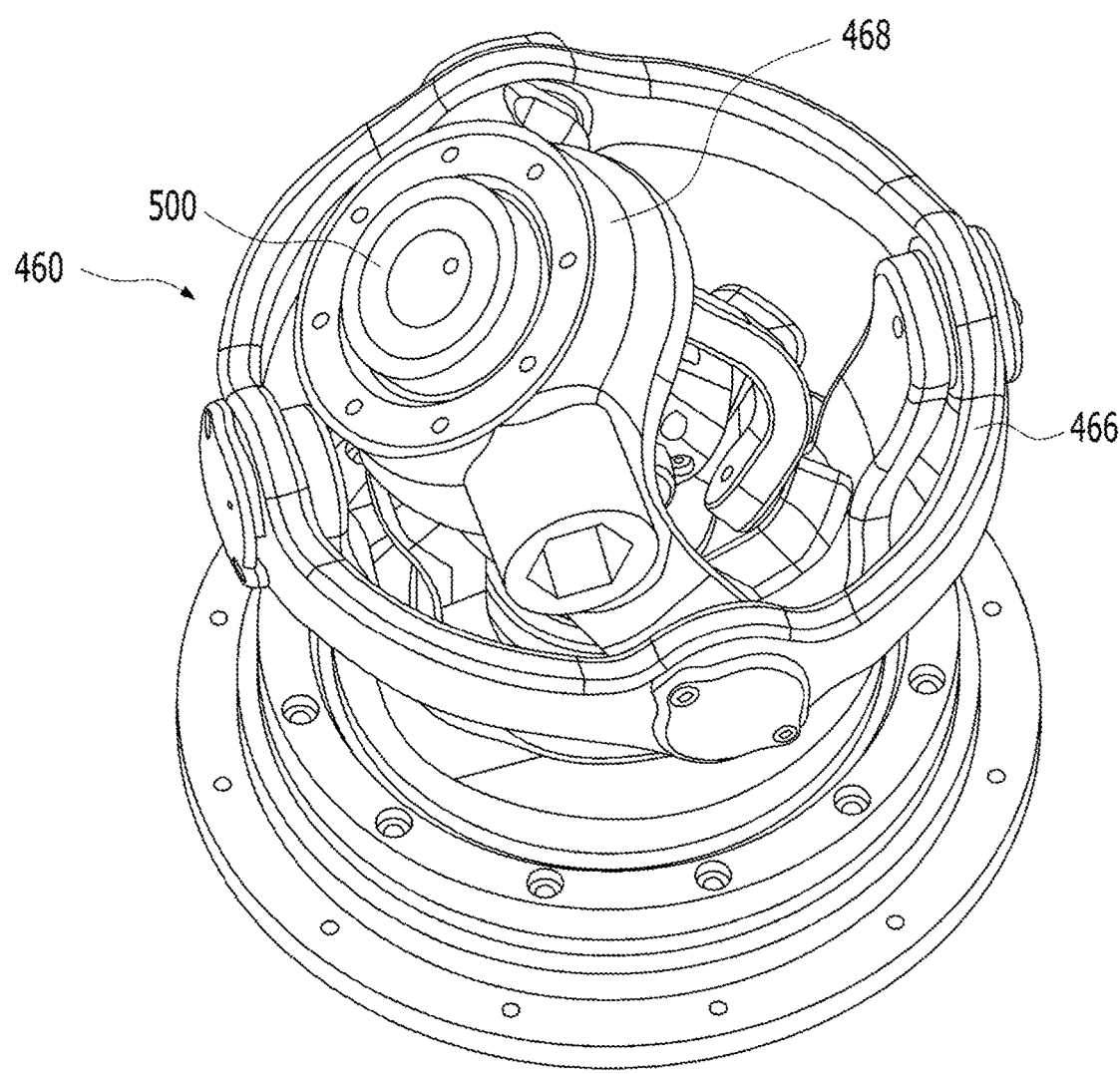
Figure 13:
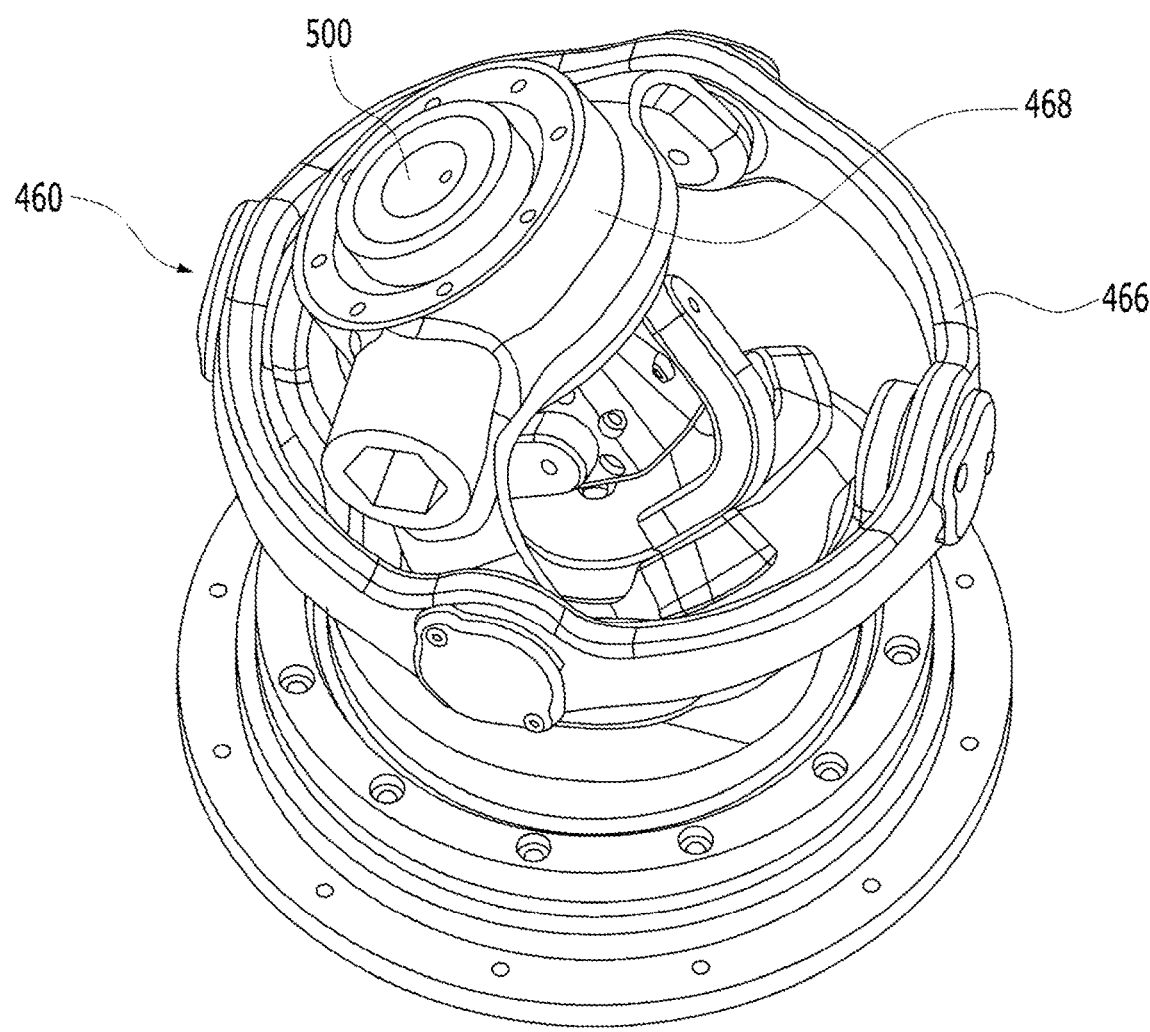
Figure 14:
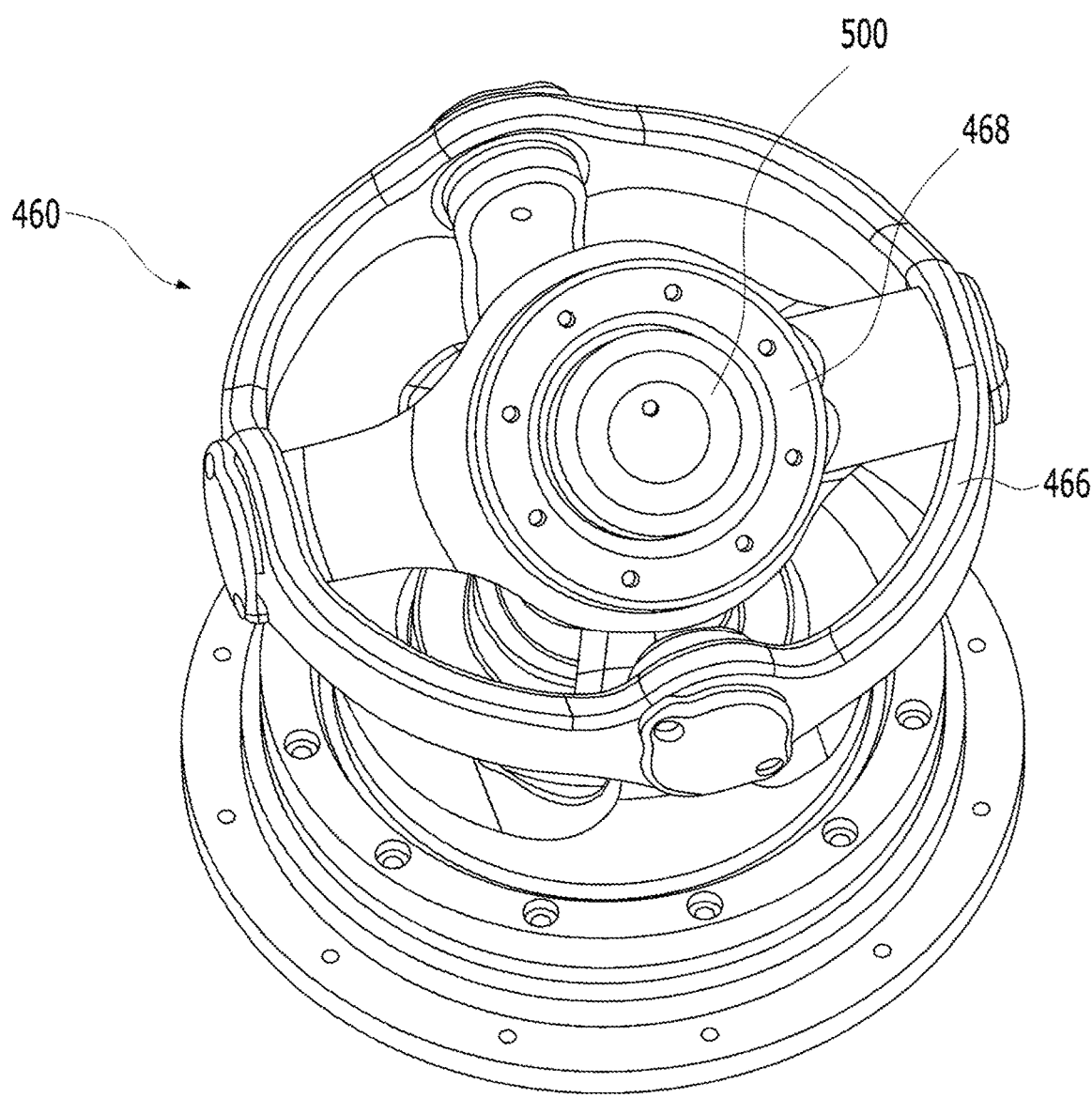
Figure 15:
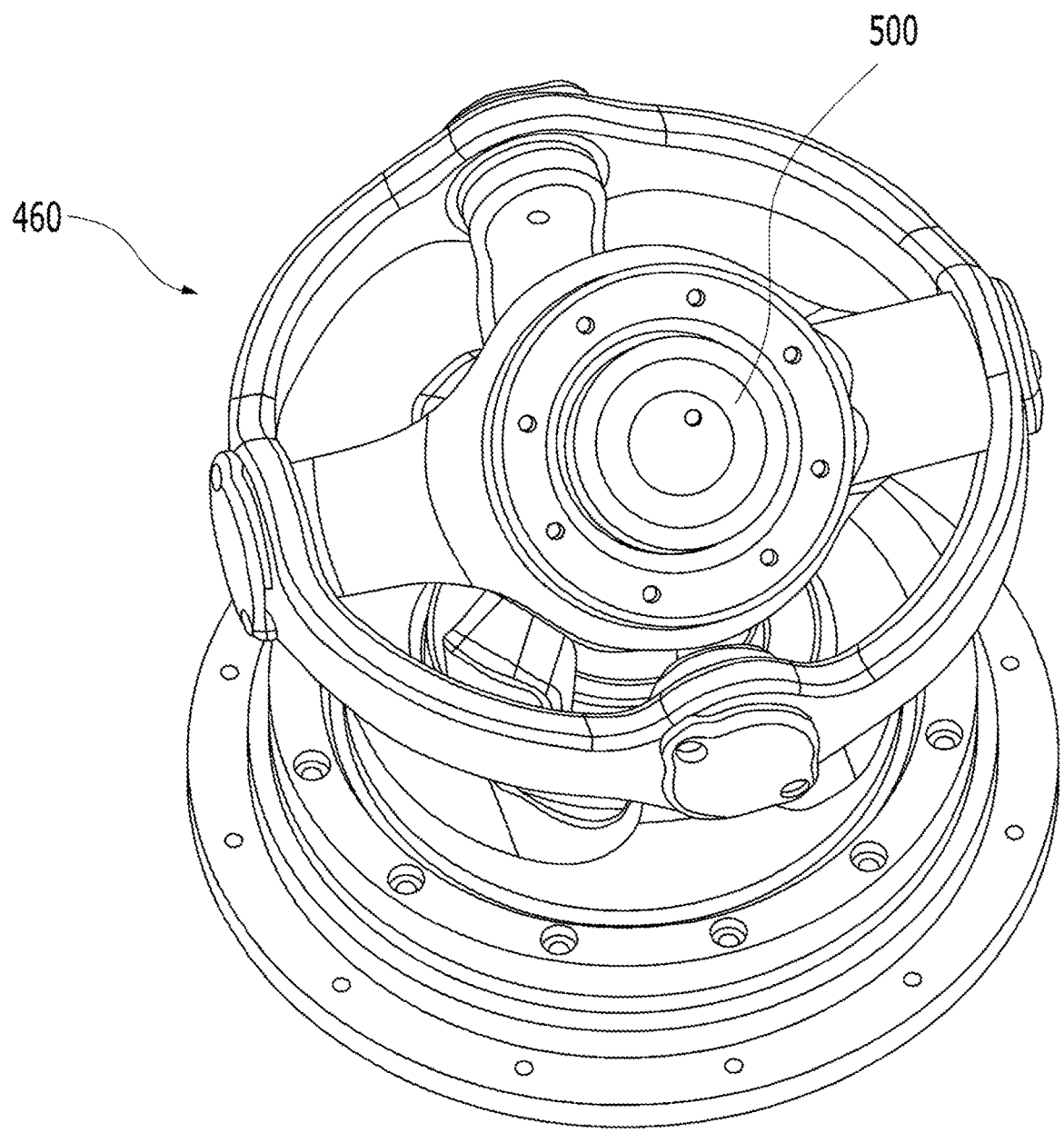

Meanwhile, as shown in FIGS. 6 to 9, when there is no universal link part 460, the first rotor 140, the second rotor 240, and the third rotor 340 rotate with the same magnitude and direction so that the distal end part 500 may perform the yawing motion. However, in the case of the present invention, since there is the universal link part 460, the universal link part 460 should also be rotated together for the necessary yawing motion. In other words, as shown in FIGS. 12 to 14, the first rotor 140, the second rotor 240, the third rotor 340, and the fourth rotor 440 are rotated with the same magnitude and direction, and thus the distal end part 500 may perform the yawing motion. When the first link, the second link, the third link, and the universal link part 460 rotate in the same way, the distal end part 500 performs the yawing motion as a whole. In addition, when the first rotor 140, the second rotor 240, and the third rotor 340 simultaneously rotate while the fourth rotor 440 is fixed, the rolling motion of the distal end part 500 is realized as shown in FIGS. 14 to 16. In other words, when the first rotor 140, the second rotor 240, and the third rotor 340 simultaneously rotate, in the case where the universal link unit 460 is not present, the yawing is realized as shown in FIGS. 6 to 9, and in the case where the universal link unit 460 is present, the rolling is realized in a fixed state of the universal link part 460 as shown in FIGS. 14 to 16. In addition, in the case where the universal link unit 460 is present, the universal link part 460 is also necessary to rotate together in order to implement the yawing motion.

Figure 11:
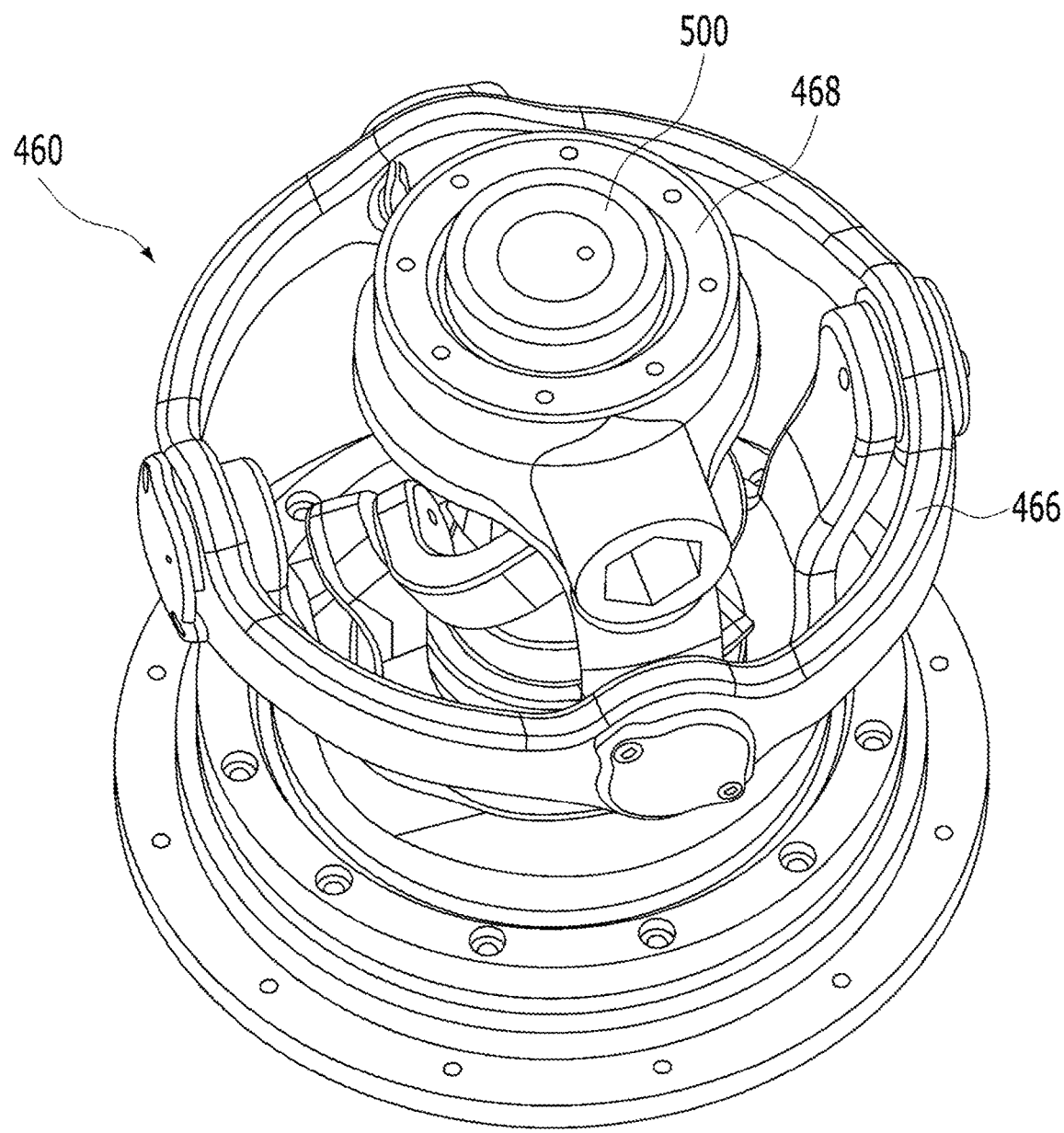
FIGS. 11 to 17 are another view showing the parallel type integrated actuator shown in FIG. 1.

Meanwhile, the universal link part 460 has a form in which the center thereof is passed by the distal end part 500, and may be provided with a joint part 468 relatively and rotatably coupled to the distal end part 500, and a connection part 462 of which one side is connected to the fourth rotor 440 and rotate with the fourth rotor 440 and the other side is connected to the joint part 468 so as to be relatively rotatable. In addition, the joint part 468 may be rotated relative to the distal end part 500 about the longitudinal axis of the distal end part 500, and may be rotated relative to the connection part 462 about an axis perpendicular to the longitudinal axis of the distal end part 500. In addition, the connection part 462 has a ring shape that surrounds the outside of the joint part 468 and may be configured to include: a ring part 466 connected to rotate relative to the joint part 468 about an axis perpendicular to the longitudinal axis of the distal end part 500; and a transmission part 464 connecting the ring part 466 and the fourth rotor 440 to each other and connected to the ring part 466 to be rotated relative to the ring part 466 about an axis perpendicular to an axis connecting the joint part 468 and the ring part 466 to each other. Through this structure, the rolling and yawing of the distal end part 500 is realized, and the universal link part 460 is not interfered in the process of pitching as shown in FIGS. 11 and 12 and serves a role as a universal joint.

Meanwhile, as shown in FIGS. 16 and 17, the first rotor 140, the second rotor 240, and the third rotor 340 are fixed so that the distal end part 500 is not rotated, but the fourth rotor 440 is rotated. Therefore, the joint part may rotate relative to the distal end part 500. In addition, through this process, separate and independent rolling of the joint part may be possible, and this rolling may be realized simultaneously with rolling, pitching, and yawing motion of the distal end part 500. This separate rolling is generated through another mechanism, thereby outputting the motion having four degrees of freedom in one joint.

According to the parallel type integrated actuator of the present invention, in realizing joints with four degrees of freedom, reproducing a free motion is possible while avoiding a collision between the instruments.

In particular, heat dissipation of the motor is effectively performed, and the size of the heat sink part is compact.

In addition, by realizing basic three degrees of freedom of pitching, yawing, and rolling, and simultaneously adding rolling thereto, another motion of a manipulator may be realized simultaneously at the end of the joints.

While realizing four degrees of freedom, a volume and weight of the joint actuator as a whole may be maximally reduced.

Although a preferred embodiment of the present invention has been described for illustrative purposes, those skilled in the art will appreciate that various modifications, additions and substitutions are possible, without departing from the technical scope and spirit of the invention as disclosed in the accompanying claims.

DESCRIPTION OF DRAWINGS

| 100: first motor | 200: second motor |
|---|---|
| 300: third motor | 400: fourth motor |
| 500: distal end part | 600: heat sink housing |
| 700: blower fan | |

The invention claimed is:

1. A parallel type integrated actuator comprising:
   a driving unit composed of a plurality of motors which are stacked successively in a longitudinal direction of the driving unit, and each motor is provided with a stator fixed to a position on outside of the driving unit and a rotor respectively positioned on inside thereof, the rotors rotating relative to each other;
   a plurality of shafts is provided with one end part thereof respectively connected to each rotor at a position on inside of each rotor, wherein each shaft is inserted into each other through a hollow structure and forming a co-axis, wherein each shaft is capable of rotating relative to each other in an inserted state, and wherein each shaft is provided with other end part thereof extending toward the outside of the driving unit;
   a distal end part disposed at the position on the outside of the driving unit, and on which an actuator is mounted thereto;
   a heat sink housing having a cylindrical shape formed around an outer surface of the driving unit, having an inner circumferential surface thereof thermally connected with the plurality of stators, and provided with a plurality of flow paths formed on an outer circumferential surface thereof; and
   a blower fan installed on one end side of the driving unit, provided with a wing part disposed to be adjacent to one end side of the heat sink housing, wherein rotation generates convection for heat exchange between air flowing through the flow paths of the heat sink housing and air outside the driving unit.

2. The parallel type integrated actuator of claim 1, wherein a fan motor of the blower fan is installed at a center of one end side of the driving unit, and the blower fan is rotated by connecting a central part and the fan motor to each other and the wing part is formed along a circumference of the central part.

3. The parallel type integrated actuator of claim 1, wherein flow paths of the heat sink housing is formed along a longitudinal direction of the heat sink housing, and the blower fan is a centrifugal fan that generates convection for the air in the flow paths of the heat sink housing and outside air in a circumferential direction thereof.

4. The parallel type integrated actuator of claim 1, wherein the heat sink housing is provided with a plurality of external heat exchange fins extending in the longitudinal direction of the heat sink housing on the outer circumferential surface of the heat sink housing and disposed in a circumferential direction thereof, and flow paths formed between the external heat exchange fins.

5. The parallel type integrated actuator of claim 1, wherein the heat sink housing is provided with a cylindrical part having a cylindrical shape surrounding the outer surface of the driving unit, a plurality of internal heat exchange fins is formed on an inner circumferential surface of the cylindrical part, and the internal heat exchange fins are thermally connected to the plurality of stators.

6. The parallel type integrated actuator of claim 5, wherein an enclosed space is formed between the inner circumferential surface of the heat sink housing with the cylindrical shape and the plurality of stators, and a heat-transfer fluid is filled in the enclosed space.

7. The parallel type integrated actuator of claim 6, wherein a separation space is formed between the stators of the driving unit, and each separation space is connected to the enclosed space so that the heat transfer fluid is also filled in the enclosed space.

8. The parallel type integrated actuator of claim 6, wherein the heat sink housing is provided with the plurality of external heat exchange fins forming flow paths on the outer circumferential surface thereof, so that the wing part of the blower fan is disposed to be adjacent to one end side of the external heat exchange fins of the heat sink housing.

9. The parallel type integrated actuator of claim 1, wherein a motor driver of the driving unit is installed on the outer circumferential surface of the heat sink housing.

10. The parallel type integrated actuator of claim 1, wherein two driving units are coupled to each other so that one end parts of the driving units are facing each other, each shaft of the driving units extends in an opposite direction at other end part of each driving unit, one blower fan is installed between one end part of each driving units, and each driving unit shares one blower fan.

11. The parallel type integrated actuator of claim 10, wherein each of the driving units is provided with the heat sink housing, and the wing parts of the blower fan is respectively adjacent to the flow paths of both heat sink housings at each of opposite sides thereof.

12. The parallel type integrated actuator of claim 10, wherein the wing part of the blower fan is provided with a plurality of wing plates formed along a circumference of the blower fan, and is in a flange shape extending outward along the circumference of the blower fan, so that a separation plate is formed to divide the wing plates into two parts, and the heat dissipation of the driving units is separated by the separation plate.

13. The parallel type integrated actuator of claim 1, wherein the driving unit is provided with a first motor, a second motor, a third motor, and a fourth motor;
   the shaft is provided with a first shaft, a second shaft, and a third shaft, which are respectively connected to the first rotor, the second rotor, and the third rotor, which are respectively each rotor of the first motor, the second motor, and the third motor; and
   the parallel type integrated actuator further comprises a first link part, a second link part, and a third link part respectively connecting the first shaft, the second shaft, and the third shaft to the distal end part and transmitting rotational force of the first shaft, the second shaft, and the third shaft to the distal end part so as to allow the distal end part to rotate in pitching, yawing, and rolling directions; and a universal link part connecting the fourth rotor, which is the rotor of the fourth motor, and the distal end part to each other.

* * * * *